United States Patent
Goodchild

(10) Patent No.: US 11,936,211 B2
(45) Date of Patent: Mar. 19, 2024

(54) MIXED ANALOG FRONT-END FOR WIRELESS CHARGING

(71) Applicant: AIRA, INC., Chandler, AZ (US)

(72) Inventor: Eric Heindel Goodchild, Phoenix, AZ (US)

(73) Assignee: AIRA, INC., Chandler, AZ (US)

(*) Notice: Subject to any disclaimer, the term of this patent is extended or adjusted under 35 U.S.C. 154(b) by 0 days.

(21) Appl. No.: 17/736,689

(22) Filed: May 4, 2022

(65) Prior Publication Data

US 2022/0360118 A1 Nov. 10, 2022

Related U.S. Application Data

(60) Provisional application No. 63/184,776, filed on May 5, 2021.

(51) Int. Cl.
*H02J 50/80* (2016.01)
*H02J 7/00* (2006.01)
*H02J 50/10* (2016.01)
*H02J 50/90* (2016.01)

(52) U.S. Cl.
CPC .......... *H02J 50/80* (2016.02); *H02J 7/00034* (2020.01); *H02J 50/10* (2016.02); *H02J 50/90* (2016.02)

(58) Field of Classification Search
CPC ........ H02J 50/80; H02J 7/00034; H02J 50/10; H02J 50/90; H02J 50/12; H02J 50/005; H02J 50/402
See application file for complete search history.

(56) References Cited

U.S. PATENT DOCUMENTS

| | | | | |
|---|---|---|---|---|
| 5,182,520 A | * | 1/1993 | Urata | H03G 5/18 |
| | | | | 327/306 |
| 6,333,909 B1 | * | 12/2001 | Zaima | G11B 7/126 |
| | | | | 369/124.01 |
| 6,522,984 B1 | * | 2/2003 | Jordanov | G01N 23/00 |
| | | | | 378/91 |

(Continued)

OTHER PUBLICATIONS

PCT/US2022/027916 International Search Report & Written Opinion (dated Jul. 29, 2022). 7 pages.

*Primary Examiner* — Rexford N Barnie
*Assistant Examiner* — Brian K Baxter
(74) *Attorney, Agent, or Firm* — LOZA & LOZA, LLP; Anthony G. Smyth

(57) ABSTRACT

Systems, methods and apparatus for wireless charging are disclosed. An apparatus includes or operates as a wireless charging device that has a battery charging power source coupled to a charging circuit, a plurality of charging cells provided on a surface of the wireless charging device and a controller or processing circuit, which may include one or more processors. The apparatus has a high-pass filter configured to extract high-frequency components from a measurement signal representative of voltage at a transmitting coil during a charging operation, a first attenuator configured to attenuate the measurement signal and provide an attenuated measurement signal, a mixer configured to add a signal representative of the high-frequency components to the attenuated measurement signal to obtain a scaled measurement signal, and a demodulator configured to decode one or more messages associated with the charging operation from the scaled measurement signal.

20 Claims, 16 Drawing Sheets

(56) References Cited

U.S. PATENT DOCUMENTS

| | | | |
|---|---|---|---|
| 2003/0034860 A1* | 2/2003 | Nakamura | H01P 1/2039 |
| | | | 333/204 |
| 2011/0204711 A1 | 8/2011 | Norconk et al. | |
| 2013/0002208 A1* | 1/2013 | Rozenboim | H02J 13/00002 |
| | | | 29/605 |
| 2013/0035034 A1* | 2/2013 | Kim | H02J 50/80 |
| | | | 455/41.1 |
| 2013/0127254 A1* | 5/2013 | Miichi | H02J 50/90 |
| | | | 307/104 |
| 2015/0171930 A1 | 6/2015 | Joehren | |
| 2015/0215005 A1 | 7/2015 | Toivanen et al. | |
| 2018/0219431 A1* | 8/2018 | Guillermo | H02J 50/12 |
| 2019/0267828 A1* | 8/2019 | Goodchild | H02J 50/90 |
| 2019/0356156 A1* | 11/2019 | Wan | H04B 5/0037 |
| 2019/0363435 A1* | 11/2019 | Makimura | H01Q 3/26 |
| 2019/0369158 A1* | 12/2019 | Murao | H03F 3/193 |
| 2020/0106307 A1* | 4/2020 | Russell | H02J 50/12 |
| 2020/0373790 A1* | 11/2020 | Sampath | F16L 29/04 |
| 2020/0381959 A1* | 12/2020 | Goodchild | H02J 50/90 |
| 2021/0210989 A1* | 7/2021 | Goodchild | H02J 50/12 |
| 2021/0210994 A1* | 7/2021 | Nerheim | H02J 50/90 |
| 2021/0228895 A1* | 7/2021 | Nicacio | A61N 1/40 |
| 2021/0384766 A1* | 12/2021 | Goodchild | H04B 5/0037 |
| 2021/0384767 A1* | 12/2021 | Goodchild | H02M 1/083 |
| 2021/0384777 A1* | 12/2021 | Goodchild | G01V 3/104 |
| 2022/0051065 A1* | 2/2022 | Goodchild | H02J 50/80 |
| 2022/0052557 A1* | 2/2022 | Goodchild | H02J 50/402 |
| 2022/0109334 A1* | 4/2022 | Goodchild | H02J 50/90 |
| 2022/0123976 A1* | 4/2022 | Mangal | H03K 19/17788 |
| 2022/0399759 A1* | 12/2022 | Zhou | H01F 27/2804 |

* cited by examiner

MIXED ANALOG FRONT-END FOR WIRELESS CHARGING

PRIORITY CLAIM

This application claims priority to and the benefit of provisional patent application No. 63/184,776 filed in the United States Patent Office on May 5, 2021 and the entire content of this application is incorporated herein by reference as if fully set forth below in its entirety and for all applicable purposes.

TECHNICAL FIELD

The present invention relates generally to wireless charging of batteries, and more particularly to communicating with a device that is being charged on a surface of a multi-coil wireless charging device.

BACKGROUND

Wireless charging systems have been deployed to enable certain types of devices to charge internal batteries without the use of a physical charging connection. Devices that can take advantage of wireless charging include mobile computing/processing devices and mobile communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Conventional wireless charging systems typically use a Digital Ping to determine if a receiving device is present on or proximate to a transmitting coil in a base station for wireless charging. A Digital Ping may also be referred to as an Active Ping. The transmitter coil has an inductance (L) and, a resonant capacitor that has a capacitance (C) is coupled to the transmitting coil to obtain a resonant LC circuit. A Ping is produced by delivering power to the resonant LC circuit. Power is applied for a duration of time (90 ms in one example) while the transmitter listens for a response from a receiving device. The response may be provided in a signal encoded using Amplitude Shift Key (ASK) modulation. In one example, a typical transmitting base station may ping as fast as 12.5 times a second (period=1/80 ms) with a power consumption of (80 mJ* 12.5) per second=1W.

Improvements in wireless charging capabilities are required to support continually increasing complexity of mobile devices and changing form factors. For example, there is a need for improved communication between power transmitters and receivers to improve control over charging procedures in multi-coil, multi-device charging devices.

DETAILED DESCRIPTION

Figure 1:
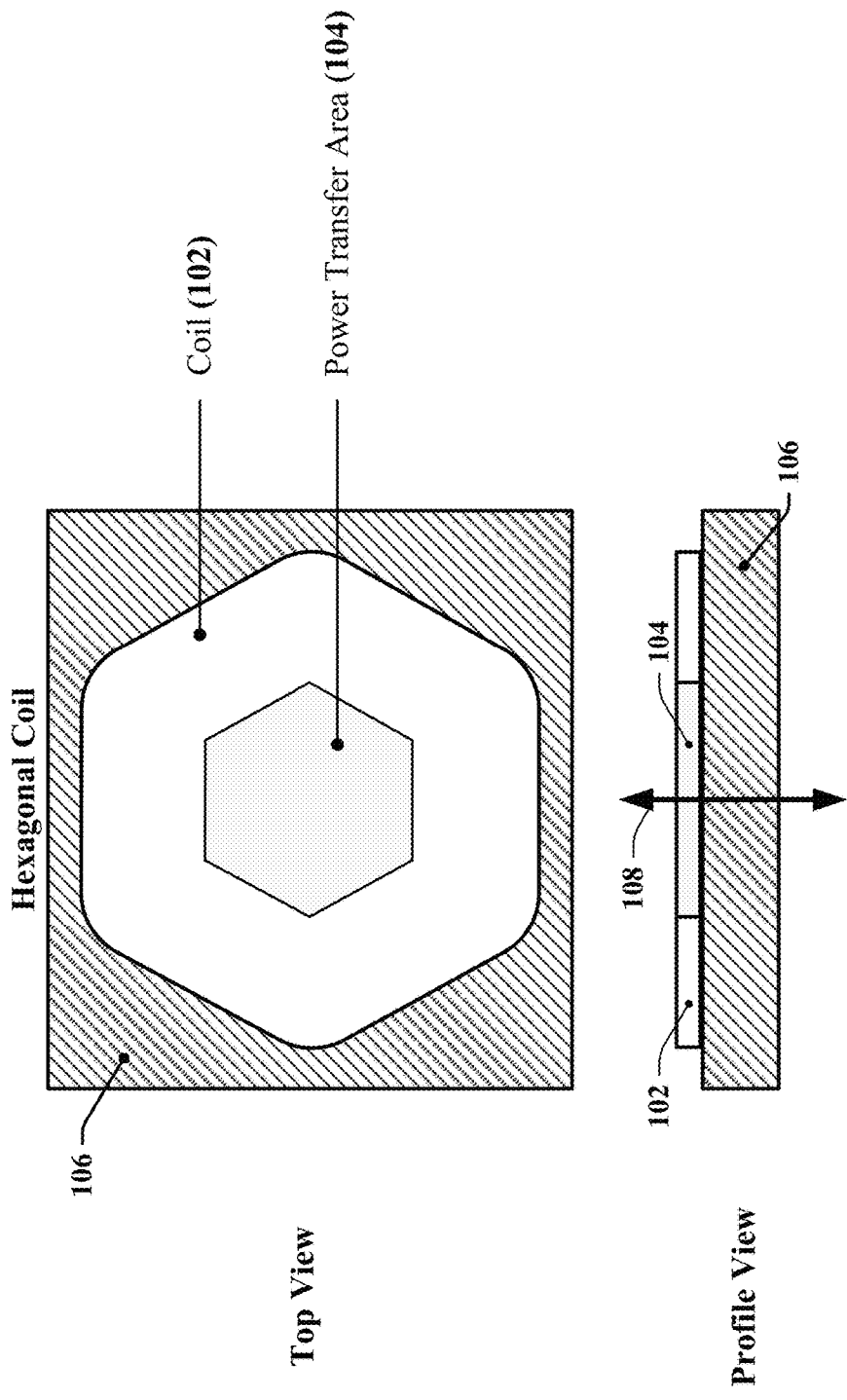
FIG. 1 illustrates an example of a charging cell that may be employed to provide a charging surface in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods associated with wireless charging devices that provide a free-positioning charging surface using multiple transmitting coils, including wireless charging devices that can concurrently charge multiple receiving devices. In one aspect, a controller in the wireless charging device can locate a device to be charged and can configure one or more transmitting coils optimally positioned to deliver power to the receiving device. Charging cells may be provisioned or configured with one or more inductive transmitting coils and multiple charging cells may be arranged or configured to provide the charging surface. The location of a device to be charged may be detected through sensing techniques that associate location of the device with changes in a physical characteristic centered at a known location on the charging surface. In some examples, sensing of location may be implemented using capacitive, resistive, inductive, touch, pressure, load, strain, and/or another appropriate type of sensing.

Certain aspects disclosed herein relate to improved wireless charging techniques. Systems, apparatus and methods are disclosed that can improve the efficiency and capacity of wireless power transmission to a receiving device through improved communication between transmitting and receiving devices. According to certain aspects disclosed herein, power can be wirelessly transferred from a transmitting device to a receiving device located anywhere on a charging surface, which can have an arbitrarily defined size or shape without regard to any discrete placement locations enabled for charging. At the transmitting device, high-frequency components may be extracted from a measurement signal representative of voltage at a transmitting coil in a wireless charging device during a charging operation. The measurement signal may be attenuated to obtain an attenuated measurement signal. A signal representative of the high-frequency components may be mixed with the attenuated measurement signal to obtain a scaled measurement signal. The scaled measurement signal may be demodulated to obtain one or more messages associated with the charging operation.

Charging Cells

Certain aspects of the present disclosure relate to systems, apparatus and methods applicable to wireless charging devices that provide a free-positioning charging surface that has multiple transmitting coils or that can concurrently charge multiple receiving devices. In one aspect, a controller in the wireless charging device can locate a device to be charged and can configure one or more transmitting coils optimally positioned to deliver power to the receiving device. Charging cells may be provisioned or configured with one or more inductive transmitting coils and multiple charging cells may be arranged or configured to provide the charging surface. The location of a device to be charged may be detected through sensing techniques that associate location of the device to changes in a physical characteristic centered at a known location on the charging surface. In some examples, sensing of location may be implemented using capacitive, resistive.

According to certain aspects disclosed herein, a charging surface in a wireless charging device may be provided using charging cells that are deployed adjacent to a surface of the charging device. In one example the charging cells are deployed in accordance with a honeycomb packaging configuration in one or more layers below or adjacent to the charging surface. A charging cell may be implemented in a wireless charging device using one or more coils that can each induce a magnetic field along an axis that is substantially orthogonal to the charging surface, adjacent to the coil. In this description, a charging cell may refer to an element having one or more coils where each coil is configured to produce an electromagnetic field that is additive with respect to the fields produced by other coils in the charging cell and directed along or proximate to a common axis. In this disclosure, a coil in a charging cell may be referred to as a charging coil, a transmitting coil, a Litz coil or using some combination of these terms.

In some implementations, a charging cell includes coils that are stacked along a common axis and/or that overlap such that they contribute to the magnetic field that is induced substantially orthogonal to the surface of the charging device. In some implementations, a charging cell includes coils that are arranged within a defined portion of the surface of the charging device and that contribute to an induced magnetic field within the defined portion of the charging surface, the magnetic field contributing to a magnetic flux flowing substantially orthogonal to the charging surface.

In some implementations, charging cells may be configurable by providing an activating current to coils that are included in one or more dynamically-defined charging cell.

For example, a wireless charging device may include multiple stacks of coils deployed across a charging surface, and the wireless charging device may detect the location of a device to be charged based on proximity to one or more stacks of coils. The charging device may select some combination of the stacks of coils to define or provide a charging cell adjacent to the device to be charged. In some instances, a charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging surface of a wireless charging device. In this disclosure, a charging surface may be understood to include an array of charging cells 100 provided on one or more substrates 106 of a printed circuit board, or an array of charging coils embedded in a structure formed from one or more substrates 106. A circuit comprising one or more integrated circuits (ICs) and/or discrete electronic components may be provided on one or more of the substrates 106. The circuit may include drivers and switches used to control currents provided to coils used to transmit power to a receiving device. The circuit may be implemented using a processing circuit that includes one or more processors and/or one or more controllers that can be configured to perform certain functions disclosed herein. In some instances, some or all of the processing circuit may be provided external to the charging device. In some instances, a power supply may be coupled to the charging device.

The charging cell 100 may be provided in close proximity to an outer surface area of the charging device, upon which one or more devices can be placed for charging. The charging device may include multiple instances of the charging cell 100. In one example, the charging cell 100 has a substantially hexagonal shape that delimits or encloses one or more coils 102. Each coil may be constructed using conductors, wires or circuit board traces that can receive a current sufficient to produce an electromagnetic field in a power transfer area 104. In various implementations, some coils 102 can have an overall shape that is substantially polygonal, including the hexagonal charging cell 100 illustrated in FIG. 1. In some implementations, one or more coils may have a flat spiral shape or a shape that is substantially circular. Other implementations provide coils 102 that are circular or elliptical in form or that have some other shape. The shape of the coils 102 may be determined at least in part by the number of windings in each coil, capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
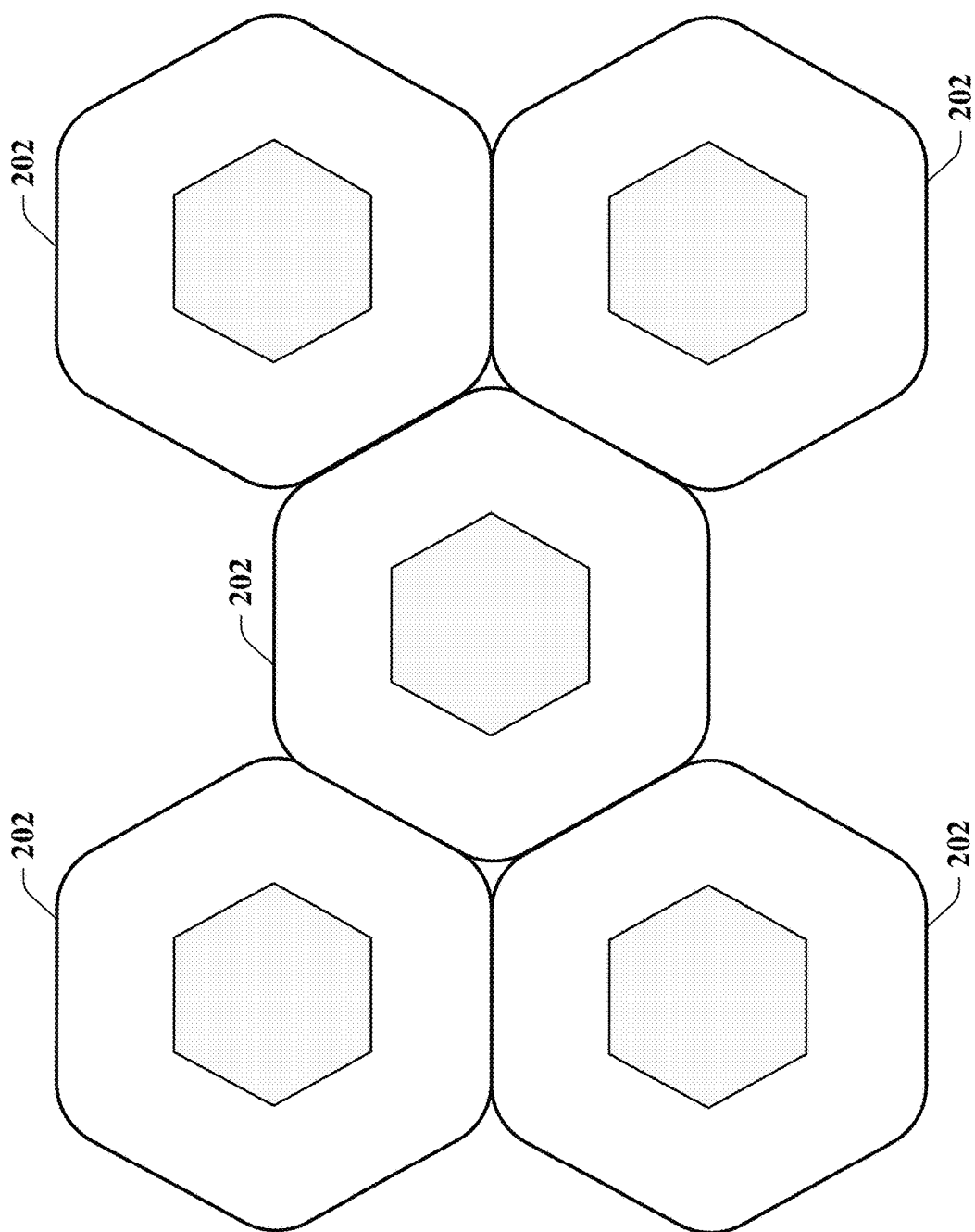
FIG. 2 illustrates an example of an arrangement of charging cells provided on a single layer of a segment of a charging surface that may be adapted in accordance with certain aspects disclosed herein.

FIG. 2 illustrates an example of an arrangement 200 of charging cells 202 provided on a single layer of a segment or portion of a charging surface that may be included in a charging system that has been adapted in accordance with certain aspects disclosed herein. The charging cells 202 are arranged according to a honeycomb packaging configuration. In this example, the charging cells 202 are arranged end-to-end without overlap. This arrangement can be provided without through-holes or wire interconnects. Other arrangements are possible, including arrangements in which some portion of the charging cells 202 overlap. For example, wires of two or more coils may be interleaved, arranged concentrically or overlaid to some extent.

Figure 3:
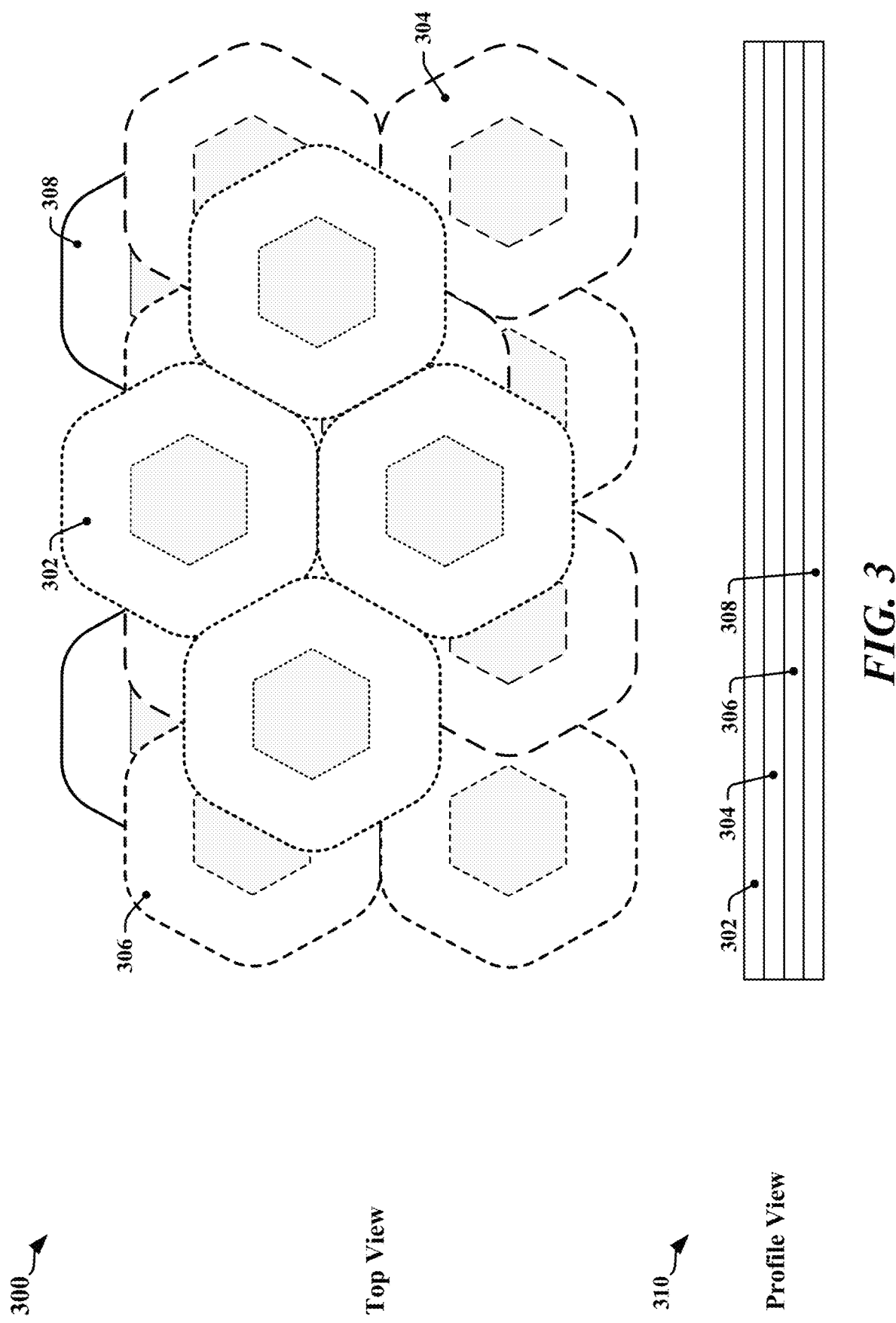
FIG. 3 illustrates an example of an arrangement of charging cells when multiple layers are overlaid within a segment of a charging surface that may be adapted in accordance with certain aspects disclosed herein.

FIG. 3 illustrates an example of an arrangement of charging cells from two perspectives 300, 310 when multiple layers are overlaid within a segment or portion of a charging surface that may be adapted in accordance with certain aspects disclosed herein. In this example, four layers of charging cells 302, 304, 306, 308 are provided within the charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more copper layers. The arrangement of charging cells 100 can be selected to provide complete coverage of a designated charging area that is adjacent to the illustrated segment.

Figure 4:
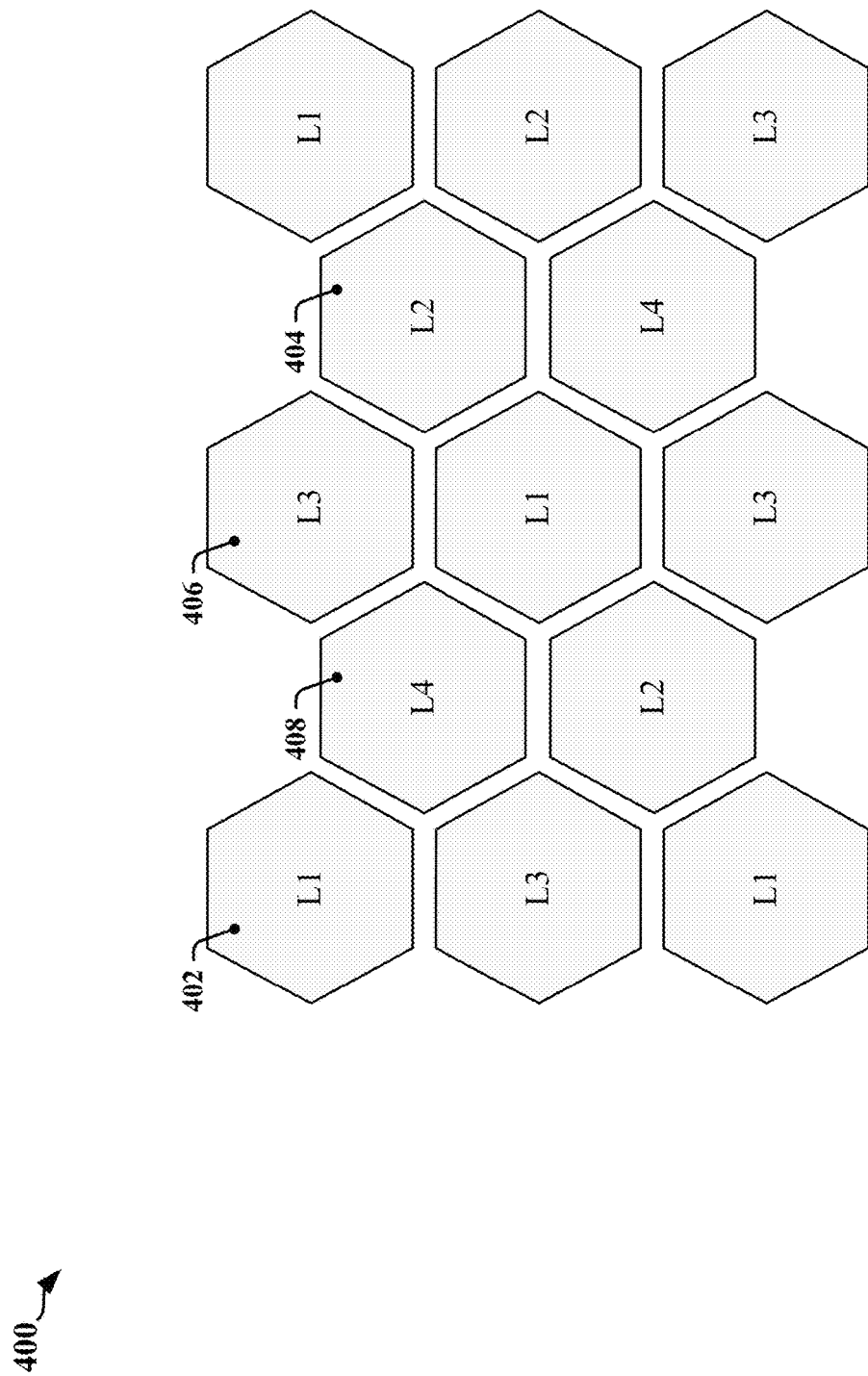
FIG. 4 illustrates the arrangement of power transfer areas provided by a charging surface that employs multiple layers of charging cells configured in accordance with certain aspects disclosed herein.

FIG. 4 illustrates the arrangement of power transfer areas defined or configured in a charging surface 400 provided by a charging system in accordance with certain aspects disclosed herein. The illustrated charging surface 400 is constructed using four layers of charging cells 402, 404, 406, 408. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Wireless Transmitter

Figure 5:
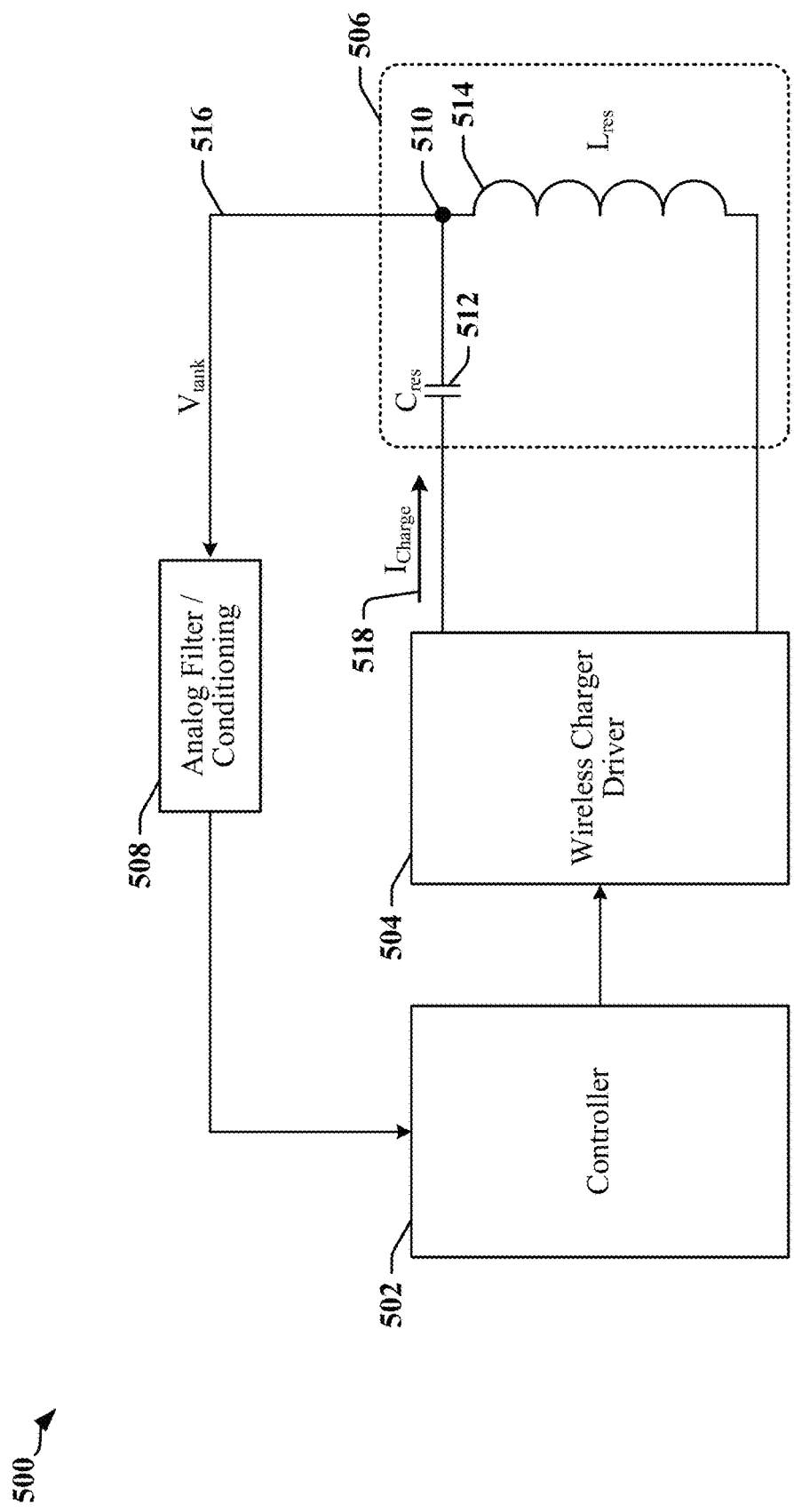
FIG. 5 illustrates a wireless transmitter that may be provided in a charger base station in accordance with certain aspects disclosed herein.

FIG. 5 illustrates certain aspects of a wireless transmitter 500 that can be provided in a base station of a wireless charging device. A base station in a wireless charging device may include one or more processing circuits used to control operations of the wireless charging device. A controller 502 may receive a feedback signal filtered or otherwise processed by a filter circuit 508. The controller may control the operation of a driver circuit 504 that provides an alternating current to a resonant circuit 506. In some examples, the controller 502 generates a digital frequency reference signal used to control the frequency of the alternating current output by the driver circuit 504. In some instances, the digital frequency reference signal may be generated using a programmable counter or the like. In some examples, the driver circuit 504 includes a power inverter circuit and one or more power amplifiers that cooperate to generate the alternating current from a direct current source or input. In some examples, the digital frequency reference signal may be generated by the driver circuit 504 or by another circuit. The resonant circuit 506 includes a capacitor 512 and inductor 514. The inductor 514 may represent or include one or more transmitting coils in a charging cell that produce a magnetic flux responsive to the alternating current. The resonant circuit 506 may also be referred to herein as a tank circuit, LC tank circuit, or LC tank, and the voltage 516 measured at an LC node 510 of the resonant circuit 506 may be referred to as the tank voltage.

Passive ping techniques may use the voltage and/or current measured or observed at the LC node 510 to identify the presence of a receiving coil in proximity to the charging pad of a device adapted in accordance with certain aspects disclosed herein. Some conventional wireless charging devices include circuits that measure voltage at the LC node 510 of the resonant circuit 506 or the current in the resonant circuit 506. These voltages and currents may be monitored for power regulation purposes and/or to support communication between devices. According to certain aspects of this disclosure, voltage at the LC node 510 in the wireless transmitter 500 illustrated in FIG. 5 may be monitored to support passive ping techniques that can detect presence of a chargeable device or other object based on response of the resonant circuit 506 to a short burst of energy (the ping) transmitted through the resonant circuit 506.

A passive ping discovery technique may be used to provide fast, low-power discovery.

A passive ping may be produced by driving a low-energy, fast pulse through a network that includes the resonant circuit 506 with a fast pulse that includes a small amount of energy. The fast pulse excites the resonant circuit 506 and causes the network to oscillate at its natural resonant frequency until the injected energy decays and is dissipated. The response of a resonant circuit 506 to a fast pulse may be determined in part by the resonant frequency of the resonant LC circuit. A response of the resonant circuit 506 to a passive ping that has initial voltage (Vo) may be represented by the voltage VLc observed at the LC node 510, such that:

$$V_{LC} = V_0 e^{-\left(\frac{\omega}{2Q}\right)t} \quad \text{(Eq. 1)}$$

Voltage or current in the resonant circuit 506 may be monitored when the controller 502 or another processor is using digital pings to detect presence of objects. A digital ping is produced by driving the resonant circuit 506 for a period of time. The resonant circuit 506 is a tuned network that includes a transmitting coil of the wireless charging device. A receiving device may modulate the voltage or current observed in the resonant circuit 506 by modifying the impedance presented by its power receiving circuit in accordance with signaling state of a modulating signal. The controller 502 or other processor then waits for a data modulated response that indicates that a receiving device is nearby.

Selectively Activating Coils

According to certain aspects disclosed herein, power transmitting coils in one or more charging cells may be selectively activated to provide an optimal electromagnetic field for charging a compatible device. In some instances, power transmitting coils may be assigned to charging cells, and some charging cells may overlap other charging cells. The optimal charging configuration may be selected at the charging cell level. In some examples, a charging configuration may include charging cells in a charging surface that are determined to be aligned with or located close to the device to be charged. A controller may activate a single power transmitting coil or a combination of power transmitting coils based on the charging configuration which in turn is based on detection of location of the device to be charged. In some implementations, a wireless charging device may have a driver circuit that can selectively activate one or more power transmitting coils or one or more predefined charging cells during a charging event.

Figure 6:
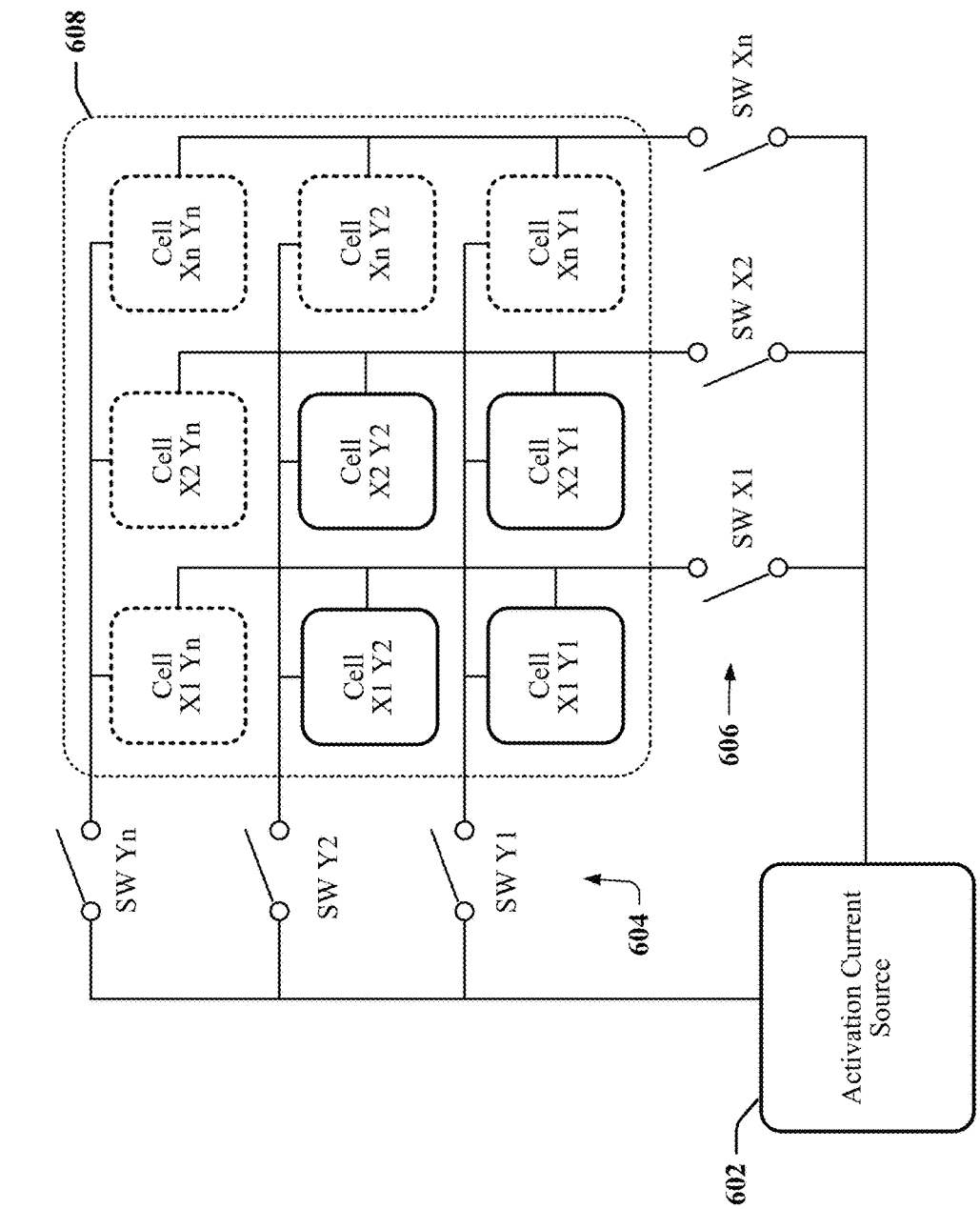
FIG. 6 illustrates a first topology that supports matrix multiplexed switching for use in a wireless charging device adapted in accordance with certain aspects disclosed herein.

FIG. 6 illustrates a first topology 600 that supports matrix multiplexed switching for use in a wireless charging device adapted in accordance with certain aspects disclosed herein. The wireless charging device may select one or more charging cells 100 to charge a receiving device. Charging cells 100 that are not in use can be disconnected from current flow. A relatively large number of charging cells 100 may be used in the honeycomb packaging configuration illustrated in FIGS. 2 and 3, requiring a corresponding number of switches. According to certain aspects disclosed herein, the charging cells 100 may be logically arranged in a matrix 608 having multiple cells connected to two or more switches that enable specific cells to be powered. In the illustrated topology 600, a two-dimensional matrix 608 is provided, where the dimensions may be represented by X and Y coordinates. Each of a first set of switches 606 is configured to selectively couple a first terminal of each cell in a column of cells to a first terminal of a voltage or current source 602 that provides current to activate coils in one or more charging cells during wireless charging. Each of a second set of switches 604 is configured to selectively couple a second terminal of each cell in a row of cells to a second terminal of the voltage or current source 602. A charging cell is active when both terminals of the cell are coupled to the voltage or current source 602.

The use of a matrix 608 can significantly reduce the number of switching components needed to operate a network of tuned LC circuits. For example, N individually connected cells require at least N switches, whereas a two-dimensional matrix 608 having N cells can be operated with AIN switches. The use of a matrix 608 can produce significant cost savings and reduce circuit and/or layout complexity. In one example, a 9-cell implementation can be implemented in a 3×3 matrix 608 using 6 switches, saving 3 switches. In another example, a 16-cell implementation can be implemented in a 4×4 matrix 608 using 8 switches, saving 8 switches.

During operation, at least 2 switches are closed to actively couple one coil or charging cell to the voltage or current source 602. Multiple switches can be closed at once in order to facilitate connection of multiple coils or charging cells to the voltage or current source 602. Multiple switches may be closed, for example, to enable modes of operation that drive multiple transmitting coils when transferring power to a receiving device.

Figure 7:
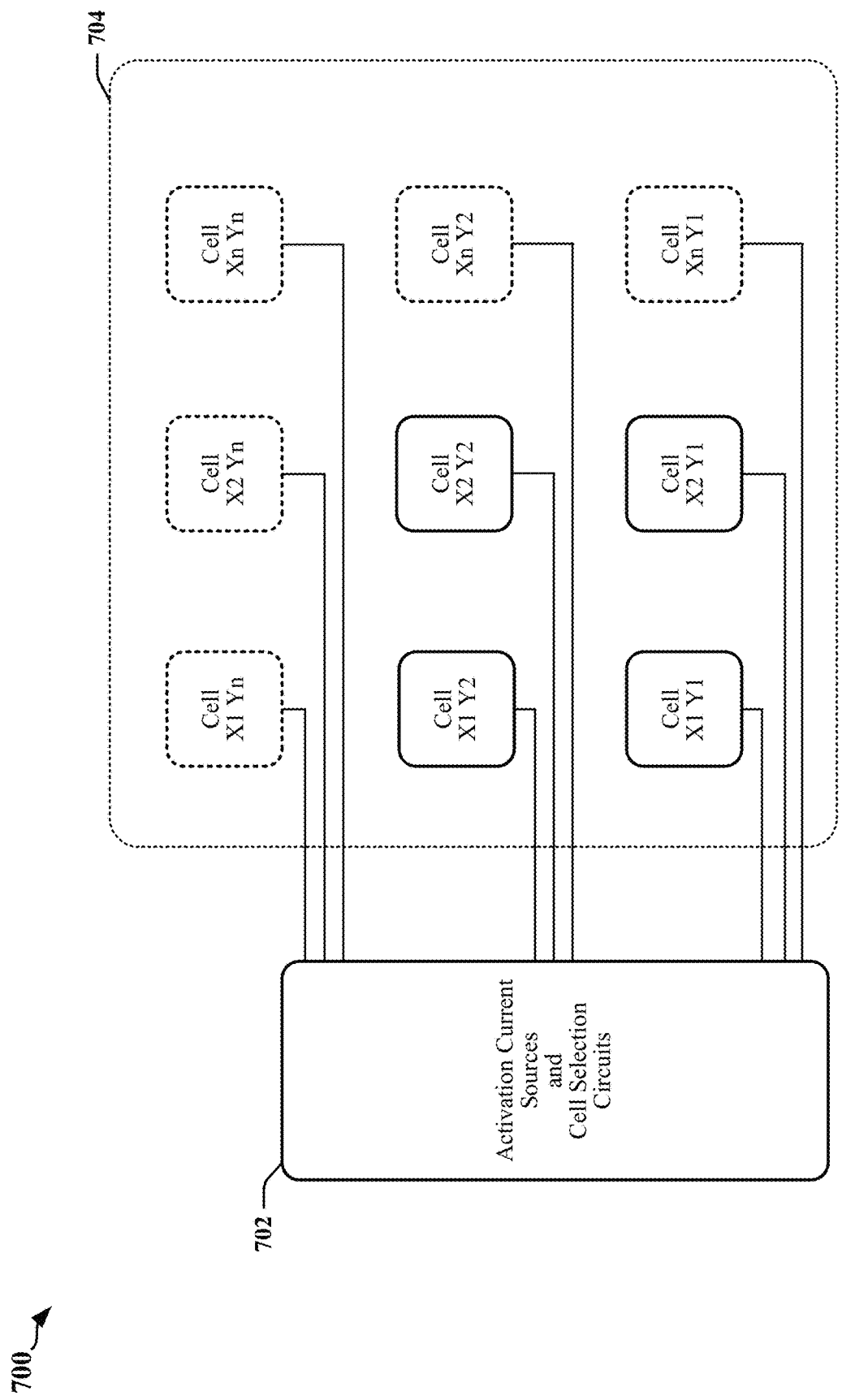
FIG. 7 illustrates a second topology that supports direct current drive in a wireless charging device adapted in accordance with certain aspects disclosed herein.

FIG. 7 illustrates a second topology 700 in which each individual coil or charging cell is directly driven by a driver circuit 702 in accordance with certain aspects disclosed herein. The driver circuit 702 may be configured to select one or more coils or charging cells 100 from a group of coils 704 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or group of coils to be used during a charging event and a second switching matrix may be used to activate the charging cell and/or group of selected coils.

Control Messaging During Charging Procedures

Certain aspects of the disclosure relate to wireless communication of configuration, control, status and other information between a power transmitter and a power receiver that is being wirelessly charged by the power transmitter. The configuration, control, status and other information may be communicated before and during power transmission and carried in messages encoded in accordance with standards-defined protocols. In one example, Qi protocols provide for the power receiver to wirelessly exercise some control over the power transmitter by enabling the power receiver to send messages through the power transmission link to the power transmitter. The messages can carry requests, commands, status and other information. Qi protocols are implemented in many wireless charging devices to manage the wireless interconnection between a power transmitter and a power receiver. Certain Qi protocols provide for the exchange of messages from power receiver to power transmitter using Amplitude Shift Keying (ASK) modulation that produces an ASK signal carried in the electromagnetic flux between the power transmitter and power receiver. In one example, the power receiver may produce the ASK signal by varying the load in its power receiving circuit. The variations in load are reflected in the load of the resonant circuit 506 during charging transactions due to the magnetic coupling between transmitting and receiving coils in the power transmitter and power receiver, respectively. The variations in load may be detected in voltage or current measured in the tank circuit.

Figure 8:
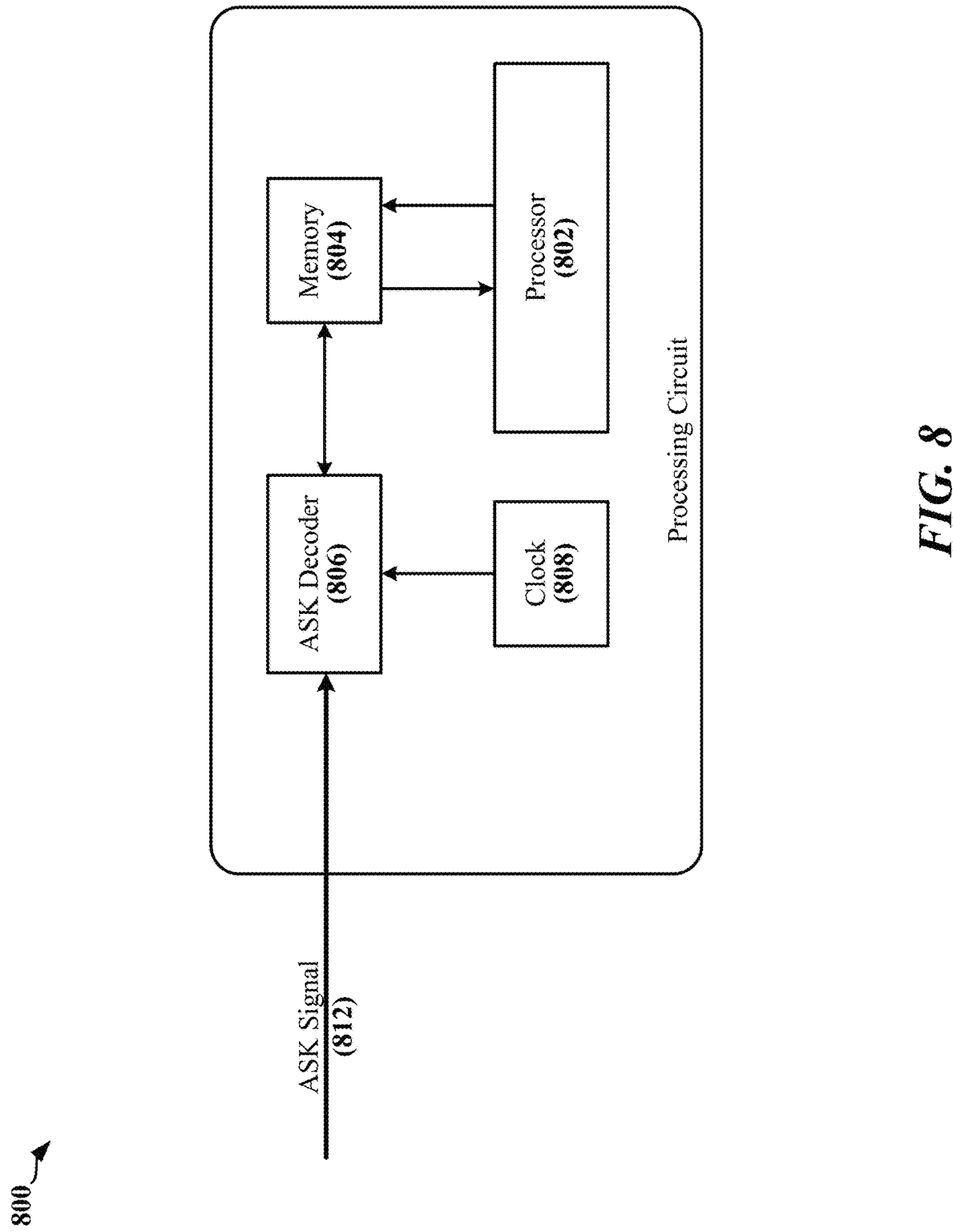
FIG. 8 illustrates a controller that supports ASK demodulation in accordance with certain aspects disclosed herein.

FIG. 8 illustrates an example of a processing circuit 800 that may be configured to receive and decode ASK-modulated signals. The processing circuit 800 includes a processor 802 that may be coupled to a memory device 804, registers or other types of storage operable to store messages to be transmitted using an ASK-modulated signal 812 and/or messages decoded from a received ASK-modulated signal 812. The processing circuit 800 includes an ASK decoder 806 that may be implemented using hardware, software or some combination of hardware and software. The ASK decoder 806 may use a clock signal received from a clock generation or recovery circuit 808 to control timing of the transmitted ASK-modulated signal 812 and to control sampling and decoding of a received ASK-modulated signal 812.

In some examples, a digital signal processor (DSP) may be employed to decode the ASK-modulated signal 812 that modulates voltage or current in the tank circuit of an inductive power transfer device. In the wireless transmitter 500 of FIG. 5, the ASK-modulated signal 812 may represent or be derived from measurement of the charging current 518 or the voltage 516 measured at an LC node 510 of the resonant circuit 506. In many examples, interrupts can be used to determine or measure timing between level changes on the ASK-modulated signal 812. In one example, a demodulation circuit may use a timer provided by a microcontroller (MCU) to measure or calculate time between edges or between interrupts triggered by edges in the ASK-modulated signal 812. A sequence of time measurements may be used to decode the ASK-modulated signal 812. In another example, a DSP or digital signal controller may be used to demodulate the ASK-modulated signal using digital signal processing methods.

Figure 9:
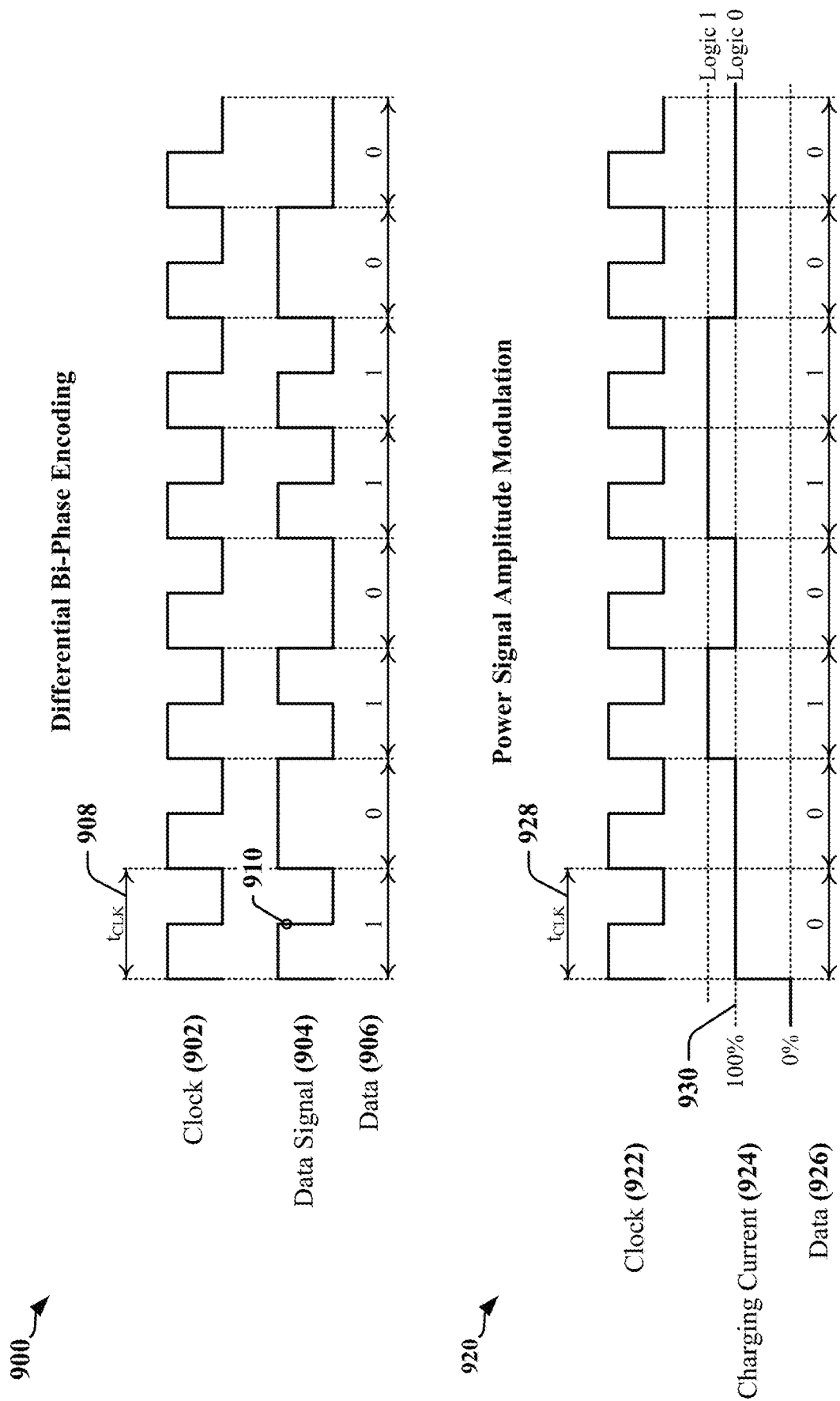
FIG. 9 illustrates examples of encoding schemes that may be adapted to digitally encode messages exchanged between power receivers and power transmitters in accordance with certain aspects disclosed herein.

FIG. 9 illustrates examples of encoding schemes 900, 920 that may be adapted to digitally encode messages exchanged between power receivers and power transmitters. In the first example, a differential bi-phase encoding scheme 900 encodes binary bits in the phase of a data signal 904. In the illustrated example, each bit of a data byte 906 is encoded in a corresponding cycle 908 of an encoder clock signal 902. The value of each bit is encoded in the presence or absence of a transition 910 (phase change) in the data signal 904 during the corresponding cycle 908.

In the second example, amplitude modulation may be used. In some instances, tank voltage or charging current 924 is modulated using a data encoding scheme 920 that defines or causes different power signal amplitudes to be observed in the tank circuit. In the illustrated example, binary bits of a data byte 926 are encoded in level of the charging current 924. Each bit of the data byte 926 is encoded in a corresponding cycle 928 of an encoder clock signal 922. The value of each bit is encoded in the voltage level of the charging current 924 relative to a nominal 100% voltage level 930 of the charging current 924 during the corresponding cycle 908.

Figure 10:
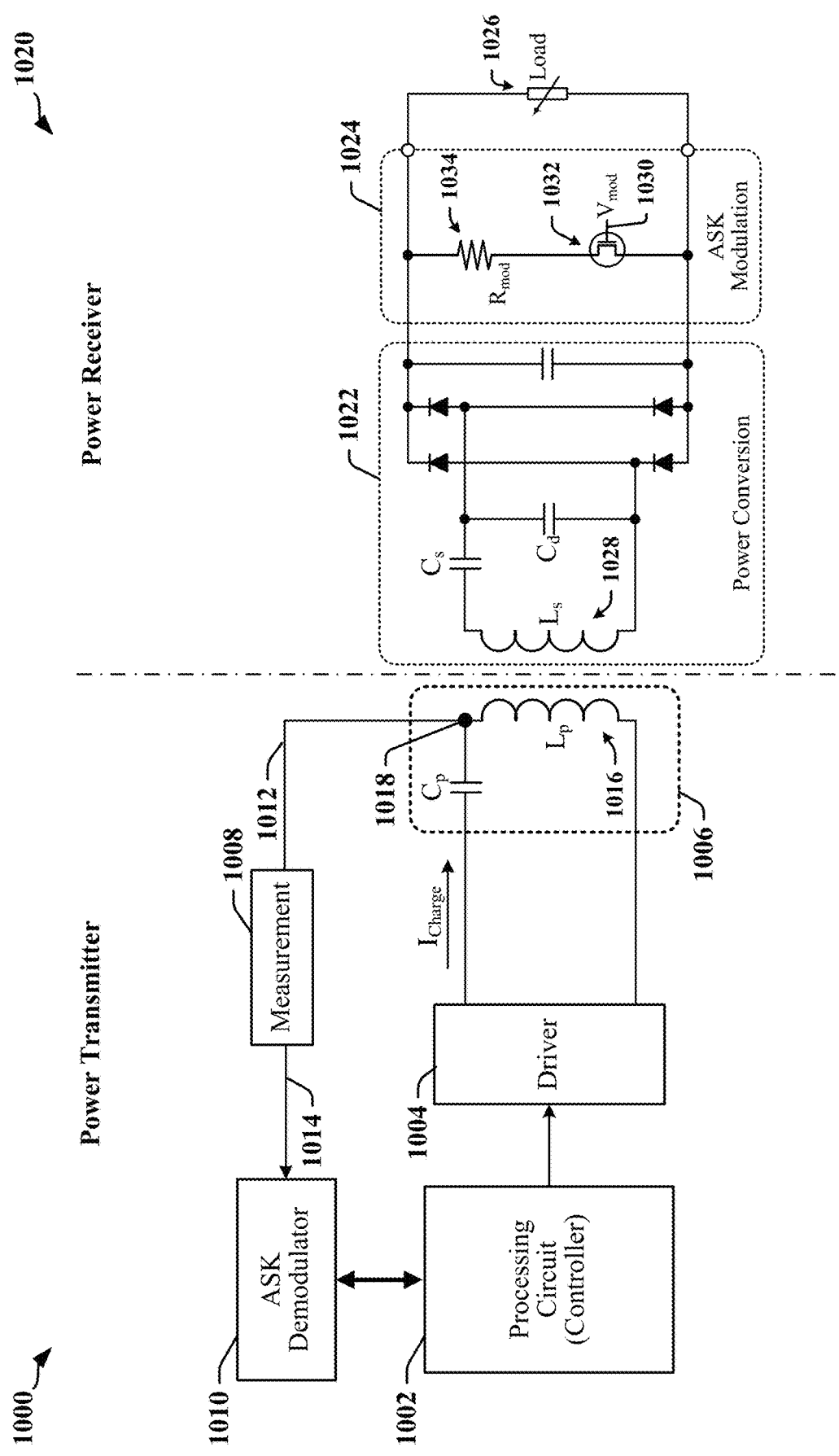
FIG. 10 illustrates a wireless transmitter configured for detecting modulated signals transmitted by a power receiving device in accordance with certain aspects disclosed herein.

FIG. 10 illustrates an example of a system that can be configured to support ASK modulation in accordance with certain aspects of this disclosure. In the illustrated example, a wireless power transmitter 1000 is configured to transmit power to a wireless power receiver 1020. Charging operations are controlled by a processing circuit 1002 that controls a driver circuit 1004 in accordance with a charging configuration defined for charging the wireless power receiver 1020. The driver circuit 1004 provides a charging current to a resonant circuit 1006 that includes at least one transmitting inductor 1016, which may represent the inductance of one or more wireless power transmitting coils. A tank voltage 1012 measured across the transmitting inductor 1016 is a product of the current flowing through the transmitting inductor 1016 and other impedances of the resonant circuit 1006. The impedances of the resonant circuit 1006 can include several components associated with the wireless power receiver 1020. For example, the impedance of a power conversion circuit 1022 and the load 1026 of the wireless power receiver 1020 contribute to the impedance of the resonant circuit 1006 during charging operations.

In some examples, the wireless power receiver 1020 has a modulation circuit 1024 that can be used to modulate the tank voltage 1012 by changing the impedance contributed by the wireless power receiver 1020 to the impedance of the resonant circuit 1006. The contributed impedance includes contributions from the power conversion circuit 1022, the load 1026 and the modulation circuit 1024. In the illustrated example, the wireless power receiver 1020 is configured to modulate the tank voltage 1012 by changing the impedance of the modulation circuit 1024. A modulation resistance 1034 coupled to the load 1026 may be switched in and out in accordance with a modulation signal applied to the gate 1030 of a switching transistor 1032. In the illustrated example, the switching transistor 1032 is configured to operate as a switch that is turned on when the modulation signal is in a first signaling state and turned off when the modulation signal is in a second signaling state. Here, the switching transistor 1032 causes the modulation resistance 1034 to be coupled in parallel with the load 1026 when the modulation signal is in the first signaling state, thereby reducing the impedance contributed to the resonant circuit 1006, with respect to the impedance of the resonant circuit 1006 when the modulation signal is in the second signaling state.

In the illustrated example, the modulation circuit 1024 is coupled in parallel with the load 1026. In other examples, the modulation circuit 1024 may be coupled in parallel with a receiving inductor 1028 in the power conversion circuit 1022.

In the illustrated example, the switching transistor 1032 is normally turned off and modulation is achieved by turning on the switching transistor 1032 to decrease the impedance of the resonant circuit 1006. In other examples, the switching transistor 1032 is normally turned on and modulation is achieved by turning on the switching transistor 1032 to increase the impedance of the resonant circuit 1006.

The wireless power transmitter 1000 may be configured to detect modulated signals transmitted by the wireless power receiver 1020. The modulated signals may be detected in the tank voltage 1012 or in the current flowing through the transmitting inductor 1016. In some examples, the modulated signals are encoded using ASK modulation. In some examples, a modulated signal used to modify the tank voltage 1012 may be encoded using pulse-width modulation.

In certain examples, a measurement circuit 1008 can be configured to obtain a measurement signal 1014 indicative of tank voltage 1012 at an LC node 1018 in the resonant circuit 1006 or indicative of current flow through the LC node 1018. The measurement circuit 1008 may be provided or configured to support a variety of calculations, including calculations or estimates of Q-factor of the resonant circuit 1006. The measurement circuit 1008 may include an analog-to-digital converter (ADC), filters, amplifiers, attenuators, comparators, counters or the like. The measurement circuit 1008 may provide a received data signal 1014 to a demodulation circuit 1010. The received data signal 1014 may be representative of a modulated signal that is a component of the tank voltage 1012. The demodulation circuit decodes information from the received data signal 1014 and provides data, control or status information to the processing circuit 1002.

Figure 11:
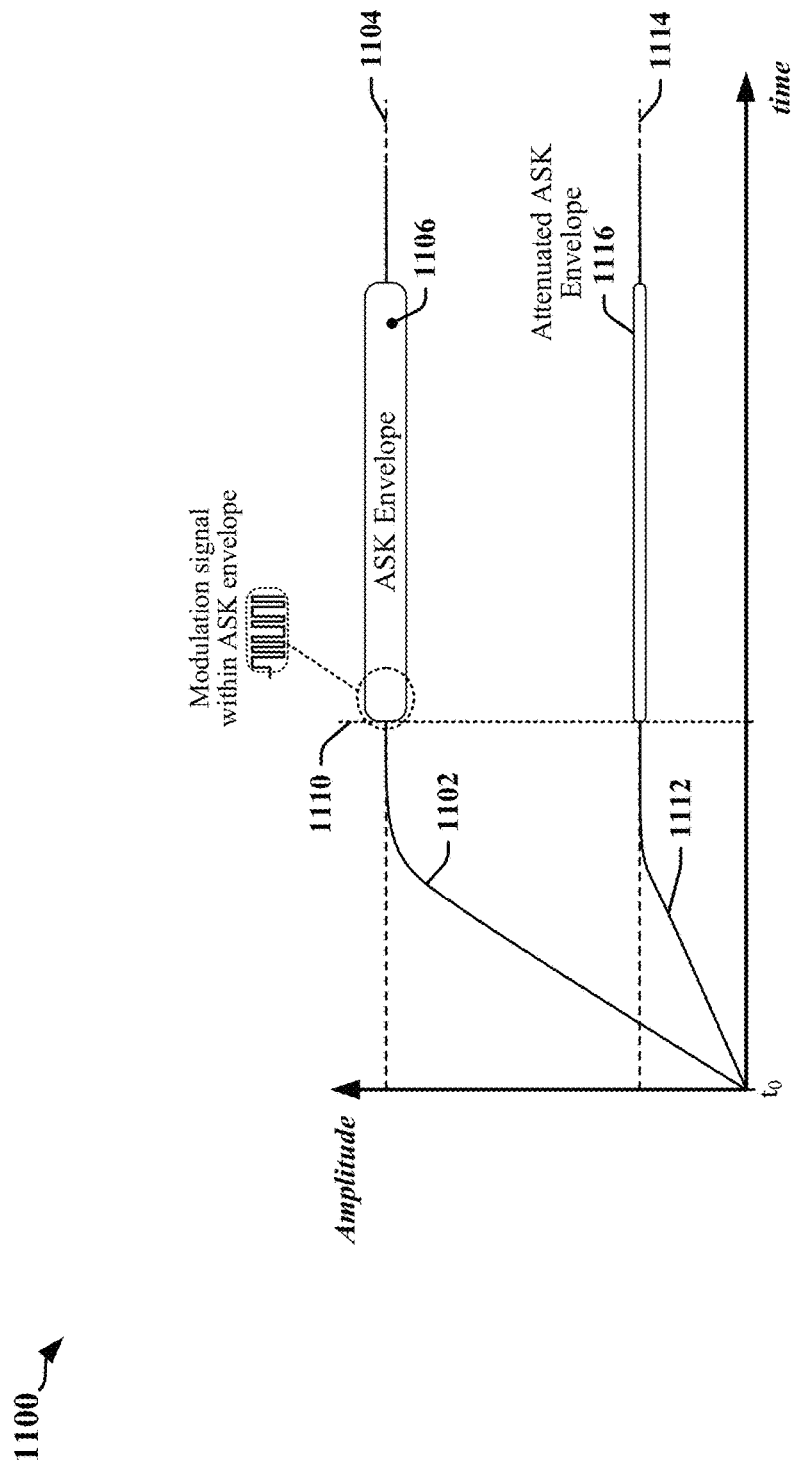
FIG. 11 illustrates certain aspects of signals used for demodulation in the wireless power transmitter illustrated in FIG. 10.

FIG. 11 is a graph 1100 that illustrates certain aspects of demodulation in the context of the wireless power transmitter 1000 illustrated in FIG. 10. A first curve 1102 represents the tank voltage 1012 during a charging operation. When power delivery commences, the tank voltage 1012 climbs to a peak voltage level. The peak voltage level may represent or be referred to as the envelope voltage level 1104, the direct current (DC) voltage level and/or the peak DC level. At some point in time 1110, the wireless power receiver 1020 begins to modulate the tank voltage 1012. The effect of the modulation may cause the tank voltage 1012 to increase or decrease the tank voltage 1012 in accordance with a modulation signal. The modulation signal is transmitted within an ASK envelope 1106 in the illustrated example, where the ASK envelope 1106 is superimposed on the envelope voltage level 1104 and represents the amplitude of excursions attributable to the modulation signal from the envelope voltage level 1104. In some wireless charging systems, the measurement circuit 1008 is configured to measure the envelope voltage level 1104 in addition to voltage levels within the ASK envelope 1106. The measurement circuit 1008 may use an ADC circuit to obtain samples of the tank voltage 1012 and may measure the voltage level of the samples to provide a digitized representation of voltage level. A processor may separate the ASK excursions from the envelope voltage level 1104 through digital processing of the ADC output.

In certain implementations, the input of the ADC circuit has a limited voltage range and can handle input signals that have a maximum amplitude of 1-2 volts, for example. The envelope voltage level 1104 may be significantly higher than 1-2 volts and can range up to 100 volts in some instances. Accordingly, the measurement circuit 1008 may scale the envelope voltage level 1104 to a lower voltage level 1114 that can be sensed by the ADC. The second curve 1112 represents the attenuated tank voltage 1012, with the corresponding attenuated ASK envelope 1116 superimposed. ASK modulation may result in an ASK envelope 1106 that has an amplitude or swing of between 0.5% and 2% of the envelope voltage level 1104. In the example of a 100-volt envelope voltage level 1104 and a 500 mV to 2V ASK modulation, the downscaling factor of 50 that is required to attenuate the envelope voltage level 1104 results in an attenuated ASK envelope 1116 that has an amplitude or swing in a 10 mV to 40 mV range. The 10 mV to 40 mV range of the attenuated ASK envelope 1116 can degrade the signal-to-noise ratio (SNR) at the input of the ADC and the ADC may have insufficient sensitivity to provide more than a few bits or increments of ADC deflection to cover the amplitude of the attenuated modulation signal. In some instances, the measurement circuit 1008 may fail to detect small variations in the attenuated modulation signal amplitude and quantization errors in the output of the ADC may cause the demodulator to generate incorrect information from the modulated signal.

Certain aspects of this disclosure provide measurement and demodulation circuits that can maximize amplitude of an ASK modulation signal derived from a measurement signal representative of tank voltage 1012, including when the measurement signal is attenuated to fall within a voltage range supported by measurement circuits. In one example, a low-frequency signal representative of the envelope voltage level 1104 is separated from a higher-frequency ASK modulation signal extracted from the ASK envelope 1106. The low-frequency and high-frequency signals are attenuated or amplified separately using a mixed signal technique that produces an input to measurement circuits in which the voltage states in the ASK modulation signal are distinguishable in an ADC output by an optimized or large number of bits. In one aspect, a high SNR for the ASK modulation signal is maintained while the low-frequency signal is attenuated, enabling accurate demodulation of the ASK modulation signal.

Figure 12:
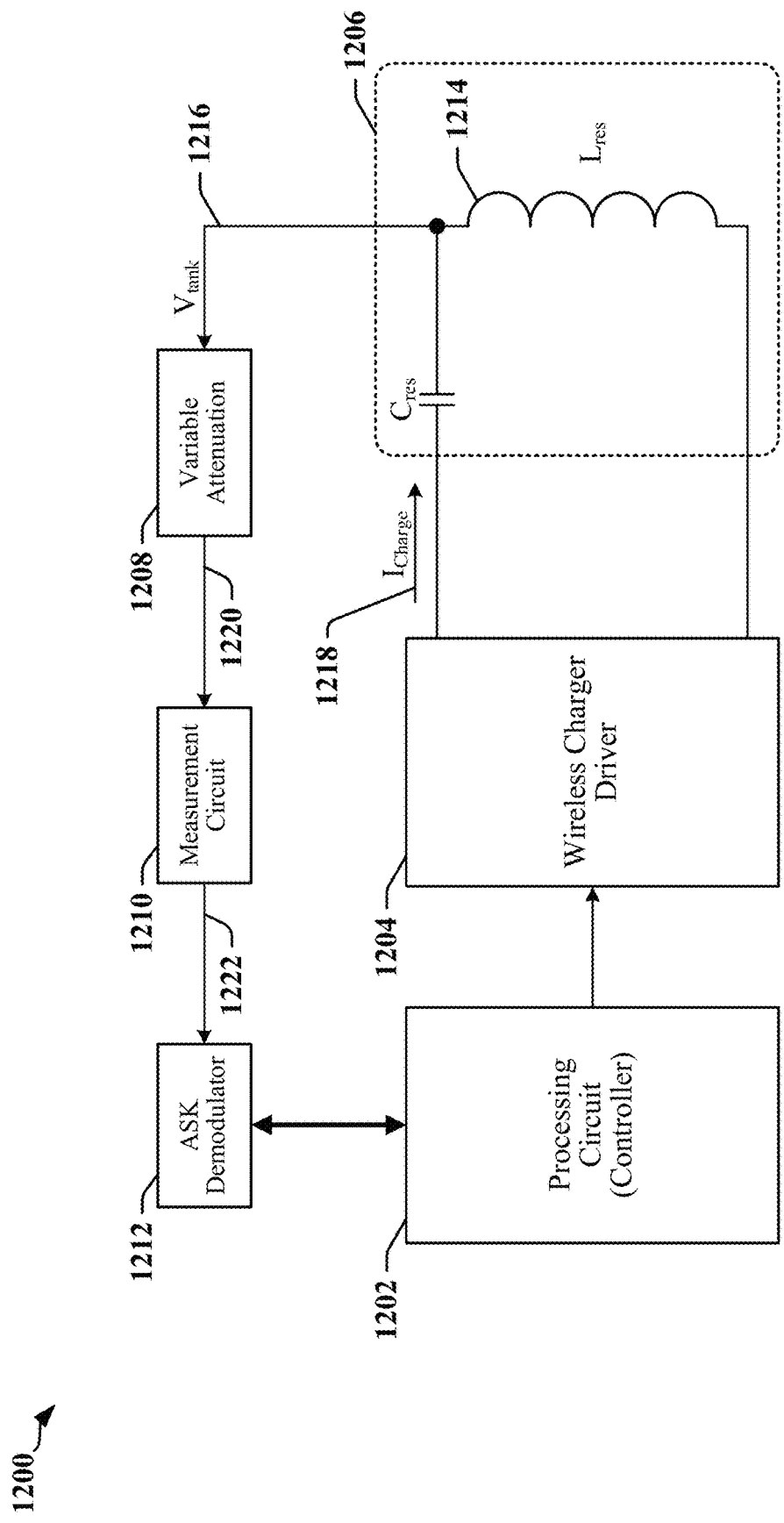
FIG. 12 illustrates a wireless power transmitter that is configured in accordance with certain aspects of this disclosure.

FIG. 12 illustrates a wireless power transmitter 1200 that is configured in accordance with certain aspects of this disclosure. The wireless power transmitter 1200 includes a processing circuit 1202 that controls a driver circuit 1204 and receives the output of an ASK demodulator 1212. The driver circuit driver circuit 1204 provides a charging current 1218 to a resonant circuit 1206 that includes at least one transmitting inductor 1214. A tank voltage signal 1216 represents the voltage measured across the transmitting inductor 1214 and may be representative of product of the current flowing through the transmitting inductor 1214 and the impedance of the resonant circuit 1206 or the transmitting inductor 1214. In some instances, the tank voltage signal 1216 represents the voltage measured across a small resistance included in the resonant circuit 1206 or between the driver circuit 1204 and the resonant circuit 1206 for measurement purposes.

Figure 13:
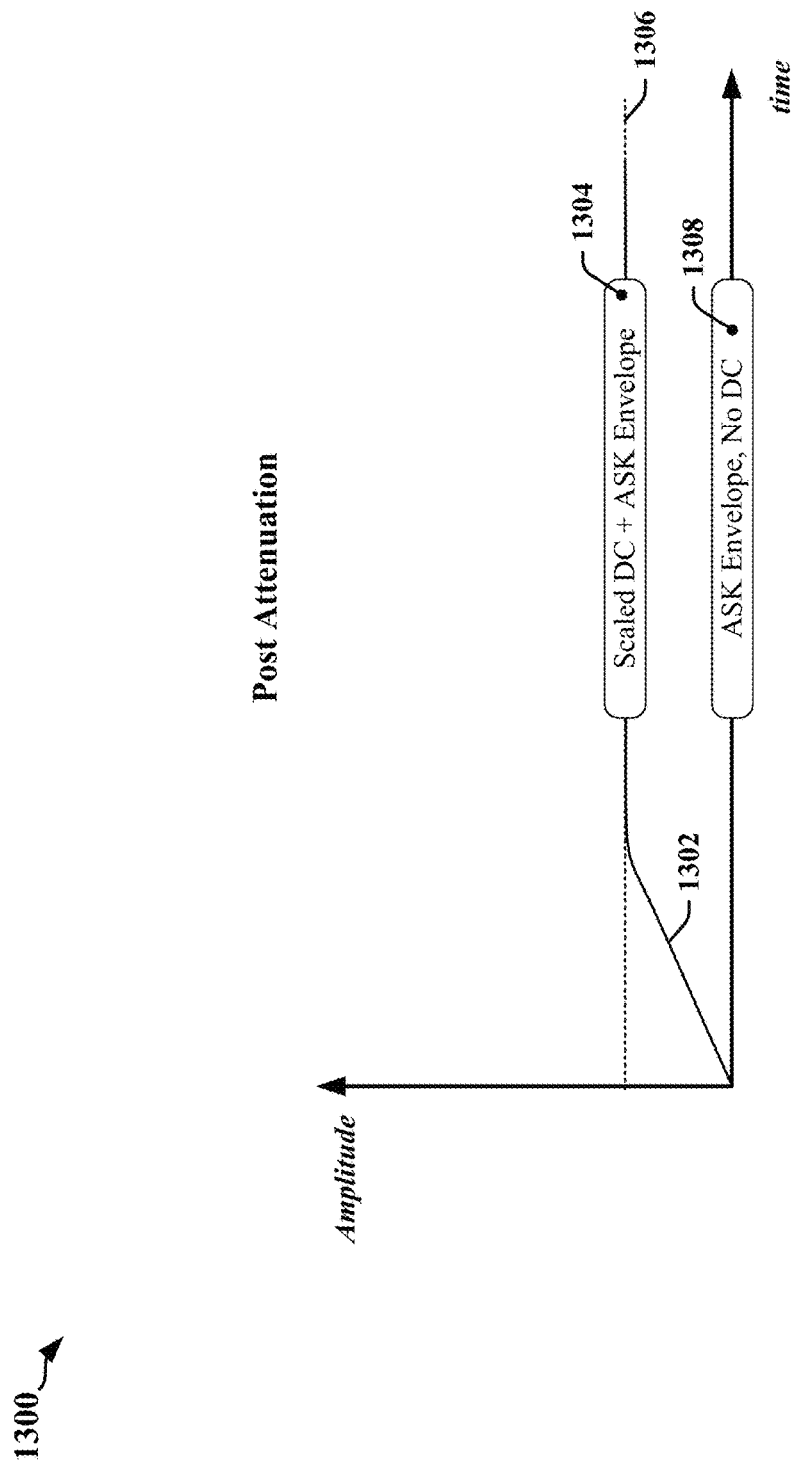
FIG. 13 illustrates the addition of an unattenuated ASK envelope to an attenuated peak voltage envelope in accordance with certain aspects disclosed herein.

The wireless power transmitter 1200 may be configured to detect modulated signals in the tank voltage signal 1216. In one example, the modulated signals are encoded using ASK modulation or pulse-width modulation. According to certain aspects of this disclosure, a variable attenuation circuit 1208 is used to apply different levels of attenuation to the peak envelope voltage level 1104 and to modulated signals represented of variations in voltage associated with the ASK envelope 1106. In one aspect of this disclosure, different attenuations may be applied to signals at different frequencies or in different frequency bands. In the example 1300 illustrated in FIG. 13, an unattenuated modulation signal comprising higher-frequency components may be extracted from the tank voltage signal 1216 using a high-pass or bandpass filter. The modulation signal is carried within the ASK envelope 1308. The lower-frequency components of the tank voltage signal 1216 can be attenuated without affecting the modulation signal. In some instances, the tank voltage signal 1216 may be rectified or averaged after extraction of the modulation signal. In some examples, a low-pass filter may be used to rectify, average or otherwise produce a DC signal representing an equivalent DC voltage level for the tank voltage signal 1216. The DC signal may be attenuated before, during or after low-pass filtering. An attenuated tank signal 1220 may be obtained by combining the higher-frequency components corresponding to the ASK envelope 1308 with the attenuated DC signal. The attenuated tank signal 1220 may be represented by the curve 1302 which depicts an attenuated, filtered version of the tank voltage signal 1216 with a superimposed unattenuated ASK envelope component 1304 corresponding to a higher frequency modulation signal generated by the receiving device. The level of attenuation applied to obtain the DC signal may be selected to obtain an average voltage level 1306 defined or configured based on input specifications for an ADC used to measure tank voltage or for an ADC included in a demodulator.

In the illustrated example 1300, the modulation signal in the ASK envelope 1308 is combined with the DC signal and the combined signal may be provided to an ADC circuit. The output of the ADC circuit may be processed by a processing circuit, digital signal processor or other suitable processing device. In some implementations, the ASK envelope 1308 is provided directly to a demodulator circuit without recombination with the DC signal. In some implementations, the ASK envelope 1308 is offset to a DC voltage level optimized for capture by an ADC used by the demodulator circuit.

In certain examples, the variable attenuation circuit 1208 may separate the ASK encoded signal from a signal representing the peak envelope voltage level 1104 (the peak envelope signal) and apply different attenuation factors to the separated signals. In another example, the variable attenuation circuit 1208 may enable the ASK encoded signal to bypass an attenuation circuit used to scale the peak envelope signal. In some examples, different automatic variable attenuations or amplifications may be applied to the ASK encoded signal and to the peak envelope signal based on respective expected, observed or measured voltage levels.

The wireless power transmitter 1200 may include a measurement circuit 1210 that generates a received data signal 1222 indicative of voltage levels of samples taken from an attenuated tank signal 1220. The received data signal 1222 may be representative of the modulated signal and may be provided to the ASK demodulator 1212, which may be configured to decode information from the received data signal 1222 and to provide data, control or status information to the processing circuit 1202.

Figure 14:
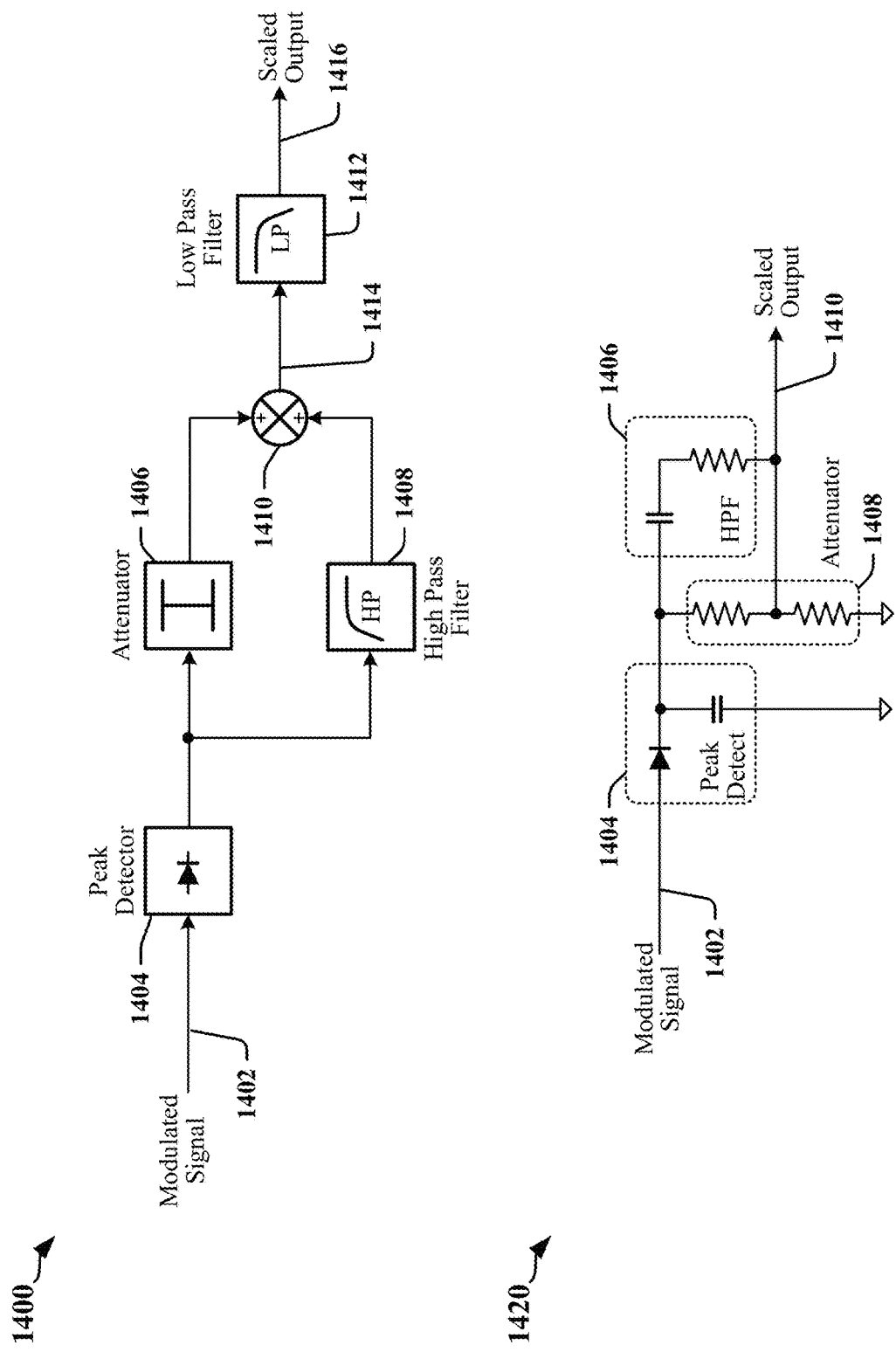
FIG. 14 illustrates an example of a variable attenuation circuit configured in accordance with certain aspects of this disclosure.

FIG. 14 illustrates an example of a variable attenuation circuit 1400 configured in accordance with certain aspects of this disclosure. A circuit diagram 1420 for one implementation of the variable attenuation circuit 1400 is also provided. In the illustrated example, a modulated signal 1402 representative of tank voltage is provided to a peak detector 1404 that can determine and hold the peak envelope voltage. The output of the peak detector 1404 is provided to an attenuator 1406 and a high-pass filter 1408. The attenuator 1406 may be configured to reduce the peak envelope voltage level to within a desired range of levels. In one example, the desired range of levels is selected for consistency with voltage limits associated with an input to an ADC circuit. In some examples, the attenuator 1406 may be adjustable and may be configured based on measured peak voltage level. The high-pass filter 1408 may be configured to block lower frequency signals, including DC levels and frequencies used for power transfer. The high-pass filter 1408 may be configured to pass signals in a range of frequencies that includes frequencies characteristic of modulation signals.

The outputs of the attenuator 1406 and the high-pass filter 1408 can be additively combined using a mixer 1410. In one example, the output 1414 of the mixer 1410 can be represented by the curve 1302 illustrated in FIG. 13. In some implementations, a scaled output 1416 is provided using a low-pass filter 1412 to remove frequencies from the output 1414 of the mixer 1410 that are higher than the expected modulation-related frequencies.

Figure 15:
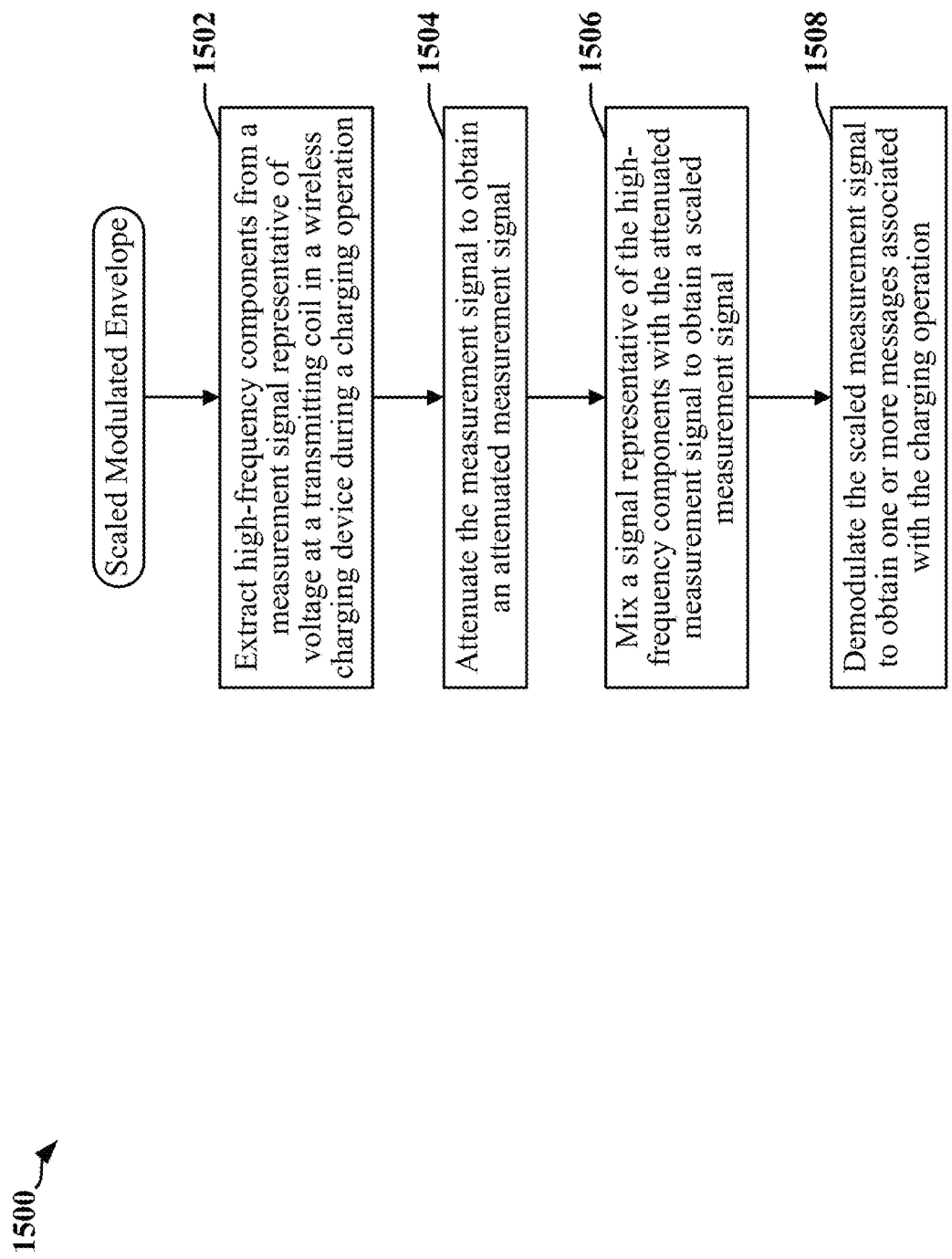
FIG. 15 is a flowchart illustrating an example of a method for communicating with a device being charged in accordance with certain aspects disclosed herein.

FIG. 15 is a flowchart 1500 illustrating an example of a method for communicating with a device being charged. The method may be performed by a controller in a multi-charging cell, multi-device wireless charger. At block 1502, the controller may extract high-frequency components from a measurement signal representative of voltage at a transmitting coil in a wireless charging device during a charging operation. At block 1504, the controller may attenuate the measurement signal to obtain an attenuated measurement signal. At block 1506, the controller may mix a signal representative of the high-frequency components with the attenuated measurement signal to obtain a scaled measurement signal. At block 1508, the controller may demodulate the scaled measurement signal to obtain one or more messages associated with the charging operation.

In some examples, mixing the signal representative of the high-frequency components with the attenuated signal includes attenuating the high-frequency components to obtain the signal representative of the attenuated high-frequency components.

In various examples, the controller may provide the scaled measurement signal to an ADC and may cause the one or more messages to be decoded from a series of digitized values provided by the ADC. The series of digitized values may represent voltage samples of the scaled measurement signal over a period of time.

In some examples, the controller may provide the scaled measurement signal to the ADC by low-pass filtering the scaled measurement signal.

In certain examples, the controller may use a high-pass filter to extract the high-frequency components from the measurement signal.

In some examples, high-frequency components correspond to an ASK-modulated signal. The ASK-modulated signal may be received from a wireless receiving device that is a participant of the charging operation.

Example of a Processing Circuit

Figure 16:
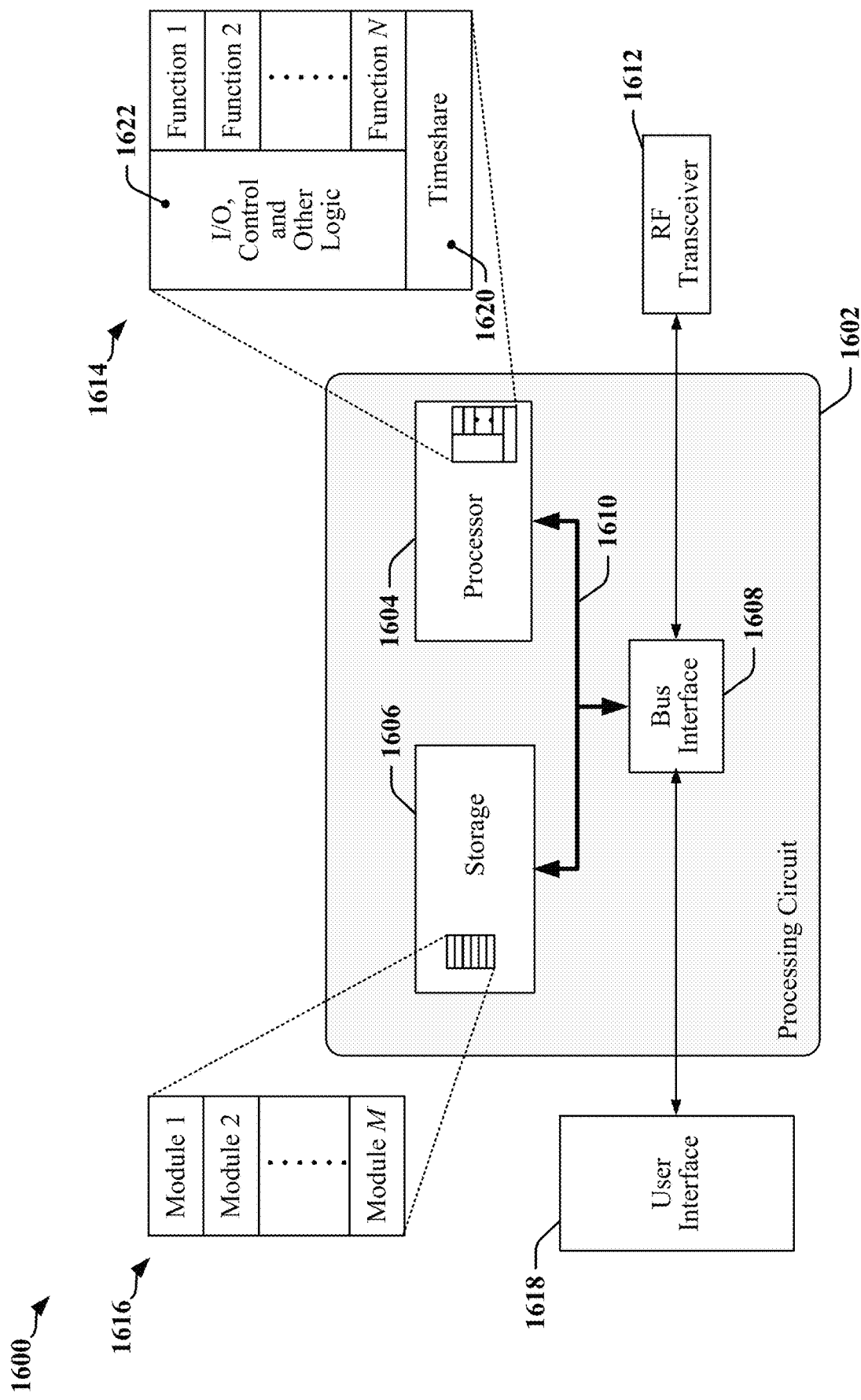
FIG. 16 illustrates one example of an apparatus employing a processing circuit that may be adapted according to certain aspects disclosed herein.

FIG. 16 illustrates an example of a hardware implementation for an apparatus 1600 that may be incorporated in a wireless charging device or in a receiving device that enables a battery to be wirelessly charged. In some examples, the apparatus 1600 may perform one or more functions disclosed herein. In accordance with various aspects of the disclosure, an element, or any portion of an element, or any combination of elements as disclosed herein may be implemented using a processing circuit 1602. The processing circuit 1602 may include one or more processors 1604 that are controlled by some combination of hardware and software modules. Examples of processors 1604 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, and storage 1606. Storage 1606 may include memory devices and mass storage devices, and may be referred to herein as computer-readable media and/or processor-readable media. The storage 1606 may include transitory storage media and/or non-transitory storage media. The bus 1610 may also link various other circuits such as timing sources, timers, peripherals, voltage regulators, and power management circuits. A bus interface 1608 may provide an interface between the bus 1610 and one or more transceivers 1612. In one example, a transceiver 1612 may be provided to enable the apparatus 1600 to communicate with a charging or receiving device in accordance with a standards-defined protocol. Depending upon the nature of the apparatus 1600, a user interface 1618 (e.g., keypad, display, speaker, microphone, joystick) may also be provided, and may be communicatively coupled to the bus 1610 directly or through the bus interface 1608.

A processor 1604 may be responsible for managing the bus 1610 and for general processing that may include the execution of software stored in a computer-readable medium that may include the storage 1606. In this respect, the processing circuit 1602, including the processor 1604, may be used to implement any of the methods, functions and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external computer-readable medium. The external computer-readable medium and/or storage 1606 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1606 may also include, by way of example, a carrier wave, a transmission line, and any other suitable medium for transmitting software and/or instructions that may be accessed and read by a computer. Computer-readable medium and/or the storage 1606 may reside in the processing circuit 1602, in the processor 1604, external to the processing circuit 1602, or be distributed across multiple entities including the processing circuit 1602. The computer-readable medium and/or storage 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1606 may maintain and/or organize software in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604. When executed, certain instructions may cause the processing circuit 1602 to perform functions in accordance with certain methods, algorithms and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as a transceiver 1612, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, processing time, access to a transceiver 1612, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, the transceiver 1612, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In one example, the multitasking environment may be implemented using a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

In one example, the apparatus 1600 includes or operates as a wireless charging device that has a battery charging power source coupled to a charging circuit, a plurality of charging cells provided on a surface of the wireless charging device and a controller or processing circuit, which may include one or more processors 1604. The plurality of charging cells may be configured or arranged adjacent to a surface that operates as a charging surface. At least one coil may be configured to direct an electromagnetic field through a charge transfer area of each charging cell.

According to certain aspects of this disclosure, the apparatus 1600 may be a power transmitter that is adapted to improve decoding of information transmitted by the receiving device by modulating the tank voltage. The apparatus 1600 may include a high-pass filter configured to extract high-frequency components from a measurement signal representative of voltage at a transmitting coil in one of the plurality of charging cells during a charging operation, a first attenuator configured to attenuate the measurement signal and provide an attenuated measurement signal, a mixer configured to add a signal representative of the high-frequency components to the attenuated measurement signal to obtain a scaled measurement signal, and a demodulator configured to decode one or more messages associated with the charging operation from the scaled measurement signal.

In some examples, the apparatus 1600 includes a second attenuator configured to attenuate the high-frequency components and to provide the signal representative of the high-frequency components.

In various examples, the apparatus 1600 includes an ADC circuit configured to receive the scaled measurement signal and to provide a series of digitized values representing voltage samples of the scaled measurement signal over a period of time. The demodulator may be configured to decode the one or more messages from the series of digitized values. The apparatus 1600 may include a low-pass filter configured to filter an output of the mixer and provide the scaled measurement signal.

In certain examples, the high-frequency components correspond to an Amplitude Shift Key modulated signal. The high-frequency components may include individual frequencies, harmonics or bands of frequencies. The Amplitude Shift Key modulated signal is received from a wireless receiving device that is a participant of the charging operation.

In another example, the storage 1606 maintains instructions and information where the instructions are configured to cause the one or more processors 1604 to extract high-frequency components from a measurement signal representative of voltage at a transmitting coil in a wireless charging device during a charging operation, attenuate the measurement signal to obtain an attenuated measurement signal, mix a signal representative of the high-frequency components with the attenuated measurement signal to obtain a scaled measurement signal, and demodulate the scaled measurement signal to obtain one or more messages associated with the charging operation.

In various examples, the storage medium includes code for attenuating the high-frequency components to obtain the signal representative of the attenuated high-frequency components.

In some examples, the storage medium includes code for providing the scaled measurement signal to an ADC circuit and decode the one or more messages from a series of digitized values provided by the ADC circuit. The series of digitized values may represent voltage samples of the scaled measurement signal over a period of time.

In certain examples, the storage medium includes code for low-pass filtering the scaled measurement signal.

In some examples, the storage medium includes code for using a high-pass filter to extract the high-frequency components from the measurement signal.

In various examples, the high-frequency components may correspond to an ASK-modulated signal. The ASK-modulated signal may be received from a wireless receiving device that is a participant of the charging operation.

Some implementation examples are described in the following numbered clauses:

1. A method for communicating with a device being charged, comprising: extracting high-frequency components from a measurement signal representative of voltage at a transmitting coil in a wireless charging device during a charging operation; attenuating the measurement signal to obtain an attenuated measurement signal; mixing a signal representative of the high-frequency components with the attenuated measurement signal to obtain a scaled measurement signal; and demodulating the scaled measurement signal to obtain one or more messages associated with the charging operation.
2. The method as described in clause 1, further comprising: attenuating the high-frequency components to obtain the signal representative of the high-frequency components.
3. The method as described in clause 1 or clause 2, further comprising: providing the scaled measurement signal to an analog-to-digital converter; and decoding the one or more messages from a series of digitized values provided by the analog-to-digital converter, wherein the series of digitized values represents voltage samples of the scaled measurement signal over a period of time.
4. The method as described in clause 3, wherein providing the scaled measurement signal to the analog-to-digital converter includes: low-pass filtering the scaled measurement signal.
5. The method as described in any of clauses 1-4, further comprising: using a high-pass filter to extract the high-frequency components from the measurement signal.
6. The method as described in any of clauses 1-5, wherein the high-frequency components correspond to an Amplitude Shift Key modulated signal.
7. The method as described in clause 6, wherein the Amplitude Shift Key modulated signal is received from a wireless receiving device that is a participant of the charging operation.
8. A wireless charging device, comprising: a plurality of charging cells provided on a surface of the wireless charging device; a high-pass filter configured to extract high-frequency components from a measurement signal representative of voltage at a transmitting coil in one of the plurality of charging cells during a charging operation; a first attenuator configured to attenuate the measurement signal and provide an attenuated measurement signal; a mixer configured to add a signal representative of the high-frequency components to the attenuated measurement signal to obtain a scaled measurement signal; and a demodulator configured to decode one or more messages associated with the charging operation from the scaled measurement signal.
9. The wireless charging device as described in clause 8, further comprising: a second attenuator configured to attenuate the high-frequency components and to provide the signal representative of the high-frequency components.

10. The wireless charging device as described in clause 8 or clause 9, further comprising: an analog-to-digital converter configured to receive the scaled measurement signal and to provide a series of digitized values representing voltage samples of the scaled measurement signal over a period of time, wherein the demodulator is configured to decode the one or more messages from the series of digitized values.

11. The wireless charging device as described in clause 10, further comprising: a low-pass filter configured to filter an output of the mixer and provide the scaled measurement signal.

12. The wireless charging device as described in any of clauses 8-11, wherein the high-frequency components correspond to an Amplitude Shift Key modulated signal.

13. The wireless charging device as described in clause 12, wherein the Amplitude Shift Key modulated signal is received from a wireless receiving device that is a participant of the charging operation.

14. A processor readable storage medium, comprising code for: extracting high-frequency components from a measurement signal representative of voltage at a transmitting coil in a wireless charging device during a charging operation; attenuating the measurement signal to obtain an attenuated measurement signal; mixing a signal representative of the high-frequency components with the attenuated measurement signal to obtain a scaled measurement signal; and demodulating the scaled measurement signal to obtain one or more messages associated with the charging operation.

15. The storage medium as described in clause 14, further comprising code for: attenuating the high-frequency components to obtain the signal representative of the high-frequency components.

16. The storage medium as described in clause 14 or clause 15, further comprising code for: providing the scaled measurement signal to an analog-to-digital converter; and decoding the one or more messages from a series of digitized values provided by the analog-to-digital converter, wherein the series of digitized values represents voltage samples of the scaled measurement signal over a period of time.

17. The storage medium as described in any of clauses 14-16, further comprising code for: low-pass filtering the scaled measurement signal.

18. The storage medium as described in any of clauses 14-17, further comprising code for: using a high-pass filter to extract the high-frequency components from the measurement signal.

19. The storage medium as described in any of clauses 14-18, wherein the high-frequency components correspond to an Amplitude Shift Key modulated signal.

20. The storage medium as described in clause 19, wherein the Amplitude Shift Key modulated signal is received from a wireless receiving device that is a participant of the charging operation.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for communicating with a device being charged, comprising:
    extracting high-frequency components from a signal representative of tank voltage that is measured at a transmitting coil in a wireless charging device during a charging operation;
    attenuating the signal representative of tank voltage to obtain an attenuated signal that has a voltage level within a range of voltage levels consistent with voltage limits associated with an input to an analog-to-digital converter circuit;
    superimposing a signal representative of the high-frequency components on the attenuated signal by addition to obtain a scaled measurement signal; and
    demodulating the scaled measurement signal to obtain one or more messages associated with the charging operation.

2. The method of claim 1, further comprising:
    attenuating the high-frequency components to obtain the signal representative of the high-frequency components.

3. The method of claim 1, further comprising:
    providing the scaled measurement signal to the analog-to-digital converter; and
    decoding the one or more messages from a series of digitized values provided by the analog-to-digital converter, wherein the series of digitized values represents voltage samples of the scaled measurement signal over a period of time.

4. The method of claim 3, wherein providing the scaled measurement signal to the analog-to-digital converter includes:
    low-pass filtering the scaled measurement signal, wherein the analog-to-digital converter is configured to measure the tank voltage.

5. The method of claim 1, further comprising:
    using a high-pass filter to extract the high-frequency components from the signal representative of the tank voltage.

6. The method of claim 1, wherein the high-frequency components correspond to an Amplitude Shift Key modulated signal.

7. The method of claim 6, wherein the Amplitude Shift Key modulated signal is received from a wireless receiving device that is a participant of the charging operation.

8. A wireless charging device, comprising:
    a plurality of charging cells provided on a surface of the wireless charging device;
    an analog-to-digital converter circuit;
    a high-pass filter configured to extract high-frequency components from a signal representative of tank voltage that is measured at a transmitting coil in one of the plurality of charging cells during a charging operation;

a first attenuator coupled to a rectifier, wherein the first attenuator and the rectifier are configured to attenuate the signal representative of tank voltage to obtain an attenuated signal that has a voltage level within a range of voltage levels consistent with voltage limits associated with an input to the analog-to-digital converter circuit;

a mixer configured to superimpose a signal representative of the high-frequency components on the attenuated signal by addition to obtain a scaled measurement signal; and a demodulator configured to decode one or more messages associated with the charging operation from the scaled measurement signal.

9. The wireless charging device of claim 8, further comprising:
a second attenuator configured to attenuate the high-frequency components and to provide the signal representative of the high-frequency components.

10. The wireless charging device of claim 8, wherein the analog-to-digital is converter configured to:
receive the scaled measurement signal; and
provide a series of digitized values representing voltage samples of the scaled measurement signal over a period of time, wherein the demodulator is configured to decode the one or more messages from the series of digitized values.

11. The wireless charging device of claim 10, further comprising:
a low-pass filter configured to filter an output of the mixer and provide the scaled measurement signal, wherein the analog-to-digital converter is configured to measure the tank voltage.

12. The wireless charging device of claim 8, wherein the high-frequency components correspond to an Amplitude Shift Key modulated signal.

13. The wireless charging device of claim 12, wherein the Amplitude Shift Key modulated signal is received from a wireless receiving device that is a participant of the charging operation.

14. A processor readable storage medium, comprising code for:
extracting high-frequency components from a signal representative of tank voltage that is measured at a transmitting coil in a wireless charging device during a charging operation;
attenuating the signal representative of tank voltage to obtain an attenuated signal that has a voltage level within a range of voltage levels consistent with voltage limits associated with an input to an analog-to-digital converter circuit;
superimposing a signal representative of the high-frequency components on the attenuated signal by addition to obtain a scaled measurement signal; and
demodulating the scaled measurement signal to obtain one or more messages associated with the charging operation.

15. The storage medium of claim 14, further comprising code for:
attenuating the high-frequency components to obtain the signal representative of the high-frequency components.

16. The storage medium of claim 14, further comprising code for:
providing the scaled measurement signal to the analog-to-digital converter; and
decoding the one or more messages from a series of digitized values provided by the analog-to-digital converter, wherein the series of digitized values represents voltage samples of the scaled measurement signal over a period of time.

17. The storage medium of claim 14, further comprising code for:
low-pass filtering the scaled measurement signal, wherein the analog-to-digital converter is configured to measure the tank voltage.

18. The storage medium of claim 14, further comprising code for:
using a high-pass filter to extract the high-frequency components from the signal representative of the tank voltage.

19. The storage medium of claim 14, wherein the high-frequency components correspond to an Amplitude Shift Key modulated signal.

20. The storage medium of claim 19, wherein the Amplitude Shift Key modulated signal is received from a wireless receiving device that is a participant of the charging operation.

* * * * *